(12) United States Patent
Papamanthou et al.

(10) Patent No.: US 10,409,845 B1
(45) Date of Patent: Sep. 10, 2019

(54) AUTHENTICATED PATTERN MATCHING AND EXACT PATH QUERIES

(71) Applicant: EMC Corporation, Hopkinton, MA (US)

(72) Inventors: Charalampos Papamanthou, Berkeley, CA (US); Roberto Tamassia, Providence, RI (US); Nikolaos Triandopoulos, Arlington, MA (US); Dimitrios Papadopoulos, Brighton, MA (US); Edward Joseph Tremel, Providence, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/838,793

(22) Filed: Mar. 15, 2013

(51) Int. Cl.
*G06F 17/30* (2006.01)
*G06F 16/33* (2019.01)

(52) U.S. Cl.
CPC .................................. *G06F 16/3344* (2019.01)

(58) Field of Classification Search
CPC ............. G06F 17/30684; G06F 21/645; G06F 16/3344
USPC ........................................................ 707/769
See application file for complete search history.

(56) References Cited

U.S. PATENT DOCUMENTS

| | | | |
|---|---|---|---|
| 7,664,742 B2* | 2/2010 | Pettovello | G06F 16/1837 707/715 |
| 2005/0135380 A1* | 6/2005 | Sahita | G06F 17/2705 370/395.32 |
| 2008/0036630 A1* | 2/2008 | Lee et al. | 341/51 |
| 2011/0225429 A1 | 9/2011 | Papamanthou et al. | |
| 2012/0030468 A1 | 2/2012 | Papamanthou et al. | |
| 2012/0159180 A1* | 6/2012 | Chase | G06F 21/6227 713/183 |

OTHER PUBLICATIONS

Zhang et al, "Approximate Pattern Matching using the Burrows-Wheeler Transform", Feb. 19, 2003, 15 pages (Year: 2003).*
Tamassia, Roberto, "Authenticated Data Structures", 2003, 4 pages (Year: 2003).*

(Continued)

*Primary Examiner* — Tony Mahmoudi
*Assistant Examiner* — Michael Le
(74) *Attorney, Agent, or Firm* — Ryan, Mason & Lewis, LLP

(57) ABSTRACT

Methods and apparatus are provided for authenticated pattern matching and authenticated exact path queries on outsourced data by a third party server. A source of the outsourced data computes verification information for node and suffix accumulators and sends the data, accumulation values and suffix tree or label trie information to the server; and publishes its public key and the verification digests. The verification may comprise an accumulation tree (AT) or any other public key authentication scheme, such as digital signatures, Merkle Trees and publishing the accumulation values. The server receives the query from a client and the server computes an answer α to the query and a verification proof that are provided to the client. The client then verifies the answer.

42 Claims, 4 Drawing Sheets

(56) References Cited

OTHER PUBLICATIONS

Gennaro et al., "Automata Evaluation and Text Search Protocols with Simulation Based Security", Jun. 3, 2010, 31 pages (Year: 2010).*

Camenisch et al., "Dynamic Accumulators and Application to Efficient Revocation of Anonymous Credentials", Feb. 2002, 15 pages (Year: 2002).*

Goodrich et al., "Efficient Verification of Web-Content Searching Through Authenticated Web Crawlers", Aug. 2012, Proceedings of the VLDB Endowment, vol. 5, No. 10, pp. 920-931, 12 pages printed. (Year: 2012).*

Papamanthou et al., Optimal Verification of Operations on Dynamic Sets, Advances in Cryptology—CRYPTO 2011, Lecture Notes in Computer Science, 6841:91-110 (2011).

Papamanthou et al., Authenticated Hash Tables, Proceedings of the 15th ACM Conference on Computer and Communications Security. pp. 437-448 (2008).

Goodrich et al., Efficient Verification of Web-Content Searching Through Authenticated Web Crawlers, Proceedings of the VLDB Endowment, vol. 5, No. 10, pp. 920-931 (2012).

\* cited by examiner

FIG. 4A

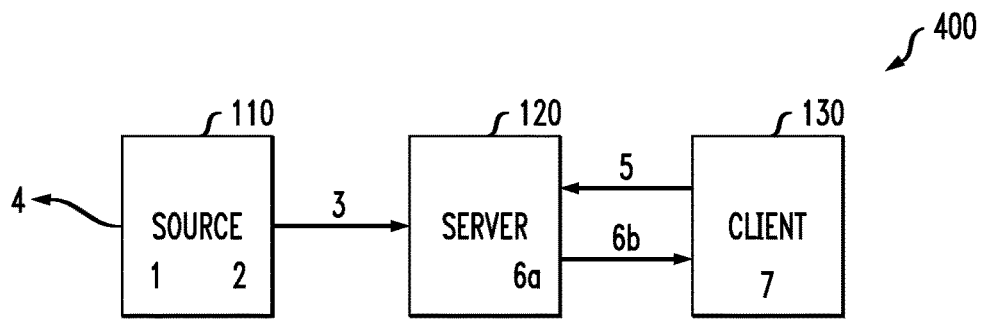

FIG. 4B

1. SOURCE 110 INITIALIZES RSA ACCUMULATORS AND VERIFICATION INFORMATION (e.g., ACCUMULATION TREES)
2. SOURCE 110 COMPUTES NODE AND SUFFIX ACCUMULATORS VERIFICATION INFORMATION (e.g., ACCUMULATION TREES)
3. SOURCE 110 SENDS TEXT, SUFFIX TREE AND ACCUMULATION VALUES TO SERVER 120
4. SOURCE 110 PUBLISHES pk AND VERIFICATION (e.g., ACCUMULATION TREE) DIGESTS
5. CLIENT 130 ISSUES QUERY q
6. SERVER 120 COMPUTES ANSWER $\alpha$ FROM SUFFIX TREE AND RUNS QUERY( ) TO PRODUCE $\Pi$. SENDS $\alpha$, $\Pi$ TO CLIENT
7. CLIENT 130 RUNS VERIFY( ) AND OUTPUTS 0/1

US 10,409,845 B1

AUTHENTICATED PATTERN MATCHING AND EXACT PATH QUERIES

FIELD OF THE INVENTION

The present invention relates generally to techniques for verifying data processing on outsourced data sets and, more particularly, to techniques for authenticated pattern matching and exact path queries.

BACKGROUND

Computation outsourcing has emerged as a common practice for enterprises and individuals, especially in the cloud setting. For example, an owner of a data set, often referred to as the source, wants to answer queries over the data set issued by one or more clients or users and, for reasons of scalability and efficiency, chooses to do so by employing a possibly untrusted server on the cloud.

An immediate by-product of outsourcing of data and computation, however, is the need for verification of the correctness of a computation. Such integrity protection is a core security goal in cloud computing. Ensuring that data contents remain intact in the lifetime of an outsourced data set and that query processing is handled correctly, producing accurate and up-to-date answers, lies at the foundation of secure cloud services.

Authenticated data structures provide cryptographically hardened integrity guarantees in distributed or cloud-based data management settings. They support authenticated queries on a data set that is outsourced to a third party and generally to an untrusted server, by allowing the server to return, along with the answer to a query, a proof that can validate the correct query execution. As such, authenticated queries find numerous applications in cloud-computing settings, where clients wish to verify the query results they receive from untrusted cloud machines.

For example, queries on the outsourced data may comprise pattern matching computations over a text to determine whether there are any patterns present in the text. In addition, queries on the outsourced data may comprise exact path queries over semi-structured data (such as XML documents).

A need exists for authenticated pattern matching and authenticated exact path queries.

SUMMARY OF THE INVENTION

The present invention in the illustrative embodiments described herein provides methods and apparatus for authenticated pattern matching and authenticated exact path queries. In one exemplary embodiment, a source of data outsources processing of a pattern matching query on the data to a server, by precomputing, for the data, a suffix tree that organizes patterns in the data, node accumulation values encoding structural information in the suffix tree, and suffix accumulation values encoding suffixes in the data; providing the data, the precomputed suffix accumulation values, the precomputed node accumulation values and the precomputed suffix tree to the server, wherein the server processes the suffix tree to generate (i) an answer specifying whether for a given pattern in the pattern matching query there is a pattern match or a pattern mismatch based on one or more of predefined matching criteria and predefined mismatching criteria, and (ii) a proof that depends on the pattern matching query, the answer, and one or more of the precomputed suffix accumulation values and the precomputed node accumulation values; and publishing public information.

In another exemplary embodiment, a server performs a pattern matching query on data on behalf of a source of the data by obtaining from the source: the data, a precomputed suffix tree that organizes patterns in the data, precomputed node accumulation values encoding structural information in the suffix tree, and precomputed suffix accumulation values encoding suffixes in the data; receiving the pattern matching query from a client; generating an answer to the pattern matching query using the suffix tree, wherein the answer specifies whether for a given pattern in the pattern matching query there is a pattern match or a pattern mismatch based on one or more of predefined matching criteria and predefined mismatching criteria; computing a proof that depends on the pattern matching query, the answer, the precomputed suffix accumulation values, and the precomputed node accumulation values; and providing the proof and the answer to the client.

In yet another exemplary embodiment, a client processes an answer to a pattern matching query performed by a server on data by providing the pattern matching query to the server, and receiving from the server an answer to the pattern matching query and a proof, wherein the server generates the answer to the pattern matching query using a suffix tree precomputed by a source of the data, wherein the suffix tree organizes patterns in the data and wherein the answer specifies for a given pattern in the pattern matching query whether there is a pattern match or a pattern mismatch based on one or more of a predefined matching criteria and a predefined mismatching criteria, and wherein the proof depends on the pattern matching query, the answer, suffix accumulation values encoding suffixes in the data precomputed by the source and node accumulation values encoding structural information in the suffix tree precomputed by the source.

The disclosed exemplary techniques for authenticated pattern matching and authenticated exact path queries overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 4A illustrates the three parties of FIG. 1 configured to implement verification of answers to pattern matching queries in accordance with aspects of the invention;

FIG. 4B illustrates the corresponding exemplary pseudo code implemented by the parties of FIG. 4A to perform verification of answers to pattern matching queries in accordance with aspects of the invention;

DETAILED DESCRIPTION

Figure 1:
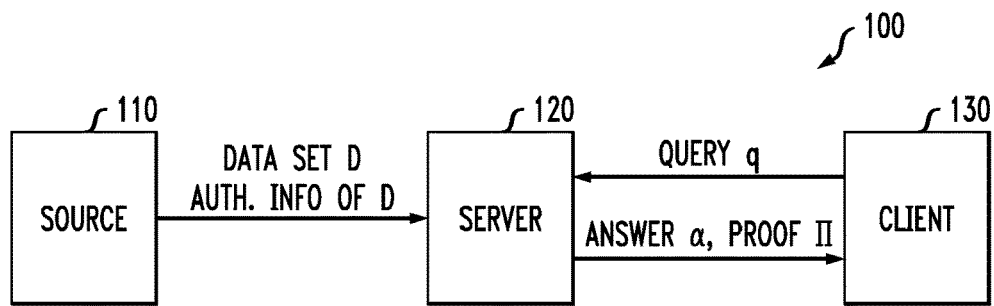
FIG. 1 illustrates an exemplary three party scenario, where a source owns data set D and multiple clients ask queries of over D.

Aspects of the present invention provide authenticated pattern matching and authenticated exact path queries.

According to one aspect of the invention, techniques are provided for verifying queries that involve pattern matching computations over a text. The exemplary embodiment employs a one-way accumulator cryptographic primitive and builds a novel encoding of the suffix tree of the text to provide an authenticated data structure for pattern matching with several important properties. The exemplary authenticated data structure for pattern matching leverages the benefits of parallelism as it can be constructed in parallel logarithmic time using a sublinear number of processors. In addition, the exemplary authenticated data structure for pattern matching achieves efficiency as it involves answer verification time that is asymptotically faster than the answer generation time using an associated proof of optimal (i.e., constant) size. Furthermore, the exemplary authenticated data structure for pattern matching allows for optimal data outsourcing as it requires no extra storage overhead with respect to the text size.

According to another aspect of the invention, techniques are provided for verifying exact path queries over semi-structured data (e.g., XML documents). The disclosed authentication scheme for exact path queries satisfies the properties above, as well as an extension to this scheme that supports efficient updates of associated objects (e.g., XML contents) in optimal (i.e., constant) update cost at the expense of producing proofs that are proportional to the answer size. Finally, by enhancing the exemplary schemes with techniques for authenticated set operations, an efficient authentication scheme is constructed for exact path queries with attribute predicates (e.g., queries returning XML elements of a particular attribute value that are reachable by a particular label path).

Two and Three Party Models

Aspects of the present invention may be employed in both a 3-party and a 2-party model of outsourced computation. Consider an owner of a data set, often referred to as the source, that wants to answer queries over the data set issued by one or more clients or users and, for reasons of scalability and efficiency, chooses to do so by employing a possibly untrusted server on the cloud.

Generally, according to aspects of the present invention, the source first performs some finger-printing signing operations on the data set, issues some publicly accessible digest information for its customers (clients) and then outsources the data set to the server. Following that, all query processing is handled by the server which produces query answers accompanied by cryptographic proofs that can be verified by the receiving user with respect to their consistency with digest of the data set.

The exemplary cryptographic proofs are constructed such that their successful verification with respect to the published digest corresponds (with overwhelming probability) to the query answer being correct, as if the query was answered locally by the trusted data owner and despite the fact that the server may act maliciously trying to subvert the verification protocol so that incorrect answers and their proofs are forged to pass the answer verification check.

The above is a generalization of the 2-party model, where a single client owns a data set and outsources it at a cloud server for storage and query processing. In this case, the source owning the data set and the clients querying the data set are in fact the same entity. Observe that the client does not need to maintain a local copy of the data set for reasons of answer verification.

FIG. 1 illustrates an exemplary three party scenario 100, where a source 110 owns data set D and multiple clients, such as client 130, ask pattern matching queries over D. In addition, as discussed below, the source 110 provides the data set D and corresponding authentication information to an untrusted server 120. The server 120 processes the queries q from the client 130 and provides an answer α with accompanying proof-of-validity Π.

Figure 2:
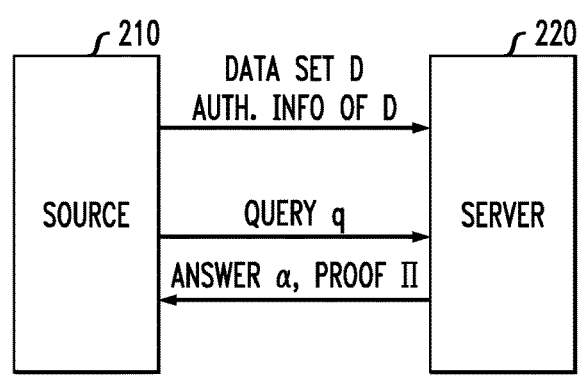
FIG. 2 illustrates an exemplary two party scenario where a source owns data set D that is authenticated by the source and outsourced to the server with the corresponding authentication information.

FIG. 2 illustrates an exemplary two party scenario 200, where a source 210 owns data set D that is authenticated by the source 210 and outsourced to the server 220 with the corresponding authentication information. The source 210 later asks the server 220 to process queries, q, and the source 210 receives an answer α with accompanying proof-of-validity Π from the server 220.

Exemplary aspects of the invention provide efficient and operation-sensitive authentication schemes, i.e., schemes where the verification time and proof size are more efficient than the corresponding verification times and proof sizes that would be obtained if the entire query-answering process was verified step-by-step and, respectively, schemes where the verification time and proof size are independent of the size of the computation and only depend on the output size and the query parameters.

Authenticated Data Structure (ADS) schemes should exhibit parallelism. Ideally, one should be able to construct an ADS scheme in parallel, in a similar manner with its non-authenticated counterpart. In this way, advanced multicore architectures can be leveraged to process massive amounts of cloud data. The exemplary disclosed authenticated suffix and XML trees have this property, maintaining the benefits of parallel algorithms known, e.g., for constructing non-authenticated suffix trees by using a cryptographic primitive known as the RSA accumulator, discussed further below. See, e.g., J. Camenisch and A. Lysyanskaya, "Dynamic Accumulators and Application to Efficient Revocation of Anonymous Credentials,' *CRYPTO*, 61-76 (2002). Parallelism is applied to the ADS model for a class of pattern-matching and path-search based computations, which often comprise a big-data problem that benefits through parallelism.

While aspects of the present invention are illustrated herein using RSA accumulators, other secure accumulator constructions can also be employed, such as a bilinear accumulator, as would be apparent to a person of ordinary skill in the art.

The exemplary authentication methods for pattern matching and exact path queries is inspired by the suffix tree data structure. The exemplary ADS scheme first defines and encodes answer-specific and search-path independent relations that are sufficient for certifying (unconditionally) that a returned answer is correct and, then, cryptographically authenticates these relations using optimal-size proofs and optimal verification times. This is achieved by employing an RSA accumulator, to create digests of tree structural relations and prefixes/suffixes of the text, overall presenting the first efficient verification technique for pattern matching queries that achieves optimal performance for all relevant cost measures. The exemplary ADS schemes share the following properties:

the space used by the data structure stored by the server 120 is O(n), where n is the size of the outsourced text/tree;

the algorithm executed by the server 120 to assemble the proof is O(1) time;

the size of the proof is O(1); and the algorithm executed by the user (client) 130 for verifying a pattern matching query is O(m) time, where m is the query pattern size or O(m+s) time for verifying an exact path XML query of size m returning s elements.

As used herein, k denotes the security parameter and neg(k) denotes a negligible function. Also, PPT stands for probabilistic polynomial time. Moreover, the text upon which pattern matching queries is supported is denoted with T and contains n characters over an alphabet $\Sigma$, where the size of the alphabet is $|\Sigma|=\sigma$. Also, m denotes the size of the pattern $p \in \Sigma^m$, the match or mismatch of which (in T) should be verified. Finally, in the following description, the concatenation of two strings $x \lfloor \Sigma^u$ and $y \in \Sigma^v$ is written as xy (order is important).

RSA Accumulator

The RSA accumulator provides an efficient technique to produce a short (computational) proof that a certain set B is subset of a set A. The RSA accumulator works as follows. Suppose there is a set of k-bit elements A. Let N be a k'-bit RSA modulus (k'>3k), namely N=pq, where p, q are strong primes. A can be represented compactly and securely with an accumulation value $acc(A)=g^{\Pi_{a \in A} r(a)}$ mod N, which is a k'-bit integer, where $g \in QR_N$ and r(a) is a 3k-bit prime representative, computed using a two-universal hash function h(.). The notion of prime representative is central for the construction of the RSA accumulator. Note that the RSA modulus N, the exponentiation base g, the two-universal hash function h and the seed of the random number generator s comprise the public key pk, i.e., information that is available to the adversary (the factorization of N is kept secret). Subject to the accumulation acc(A), the proof of subset containment for a set $B \subseteq A$ [20] will be the subset witness $W_{B,A}$ where $$W_{B,A} = g^{\Pi_{a \in A-B} r(a)} \bmod N. \quad (1)$$

Subset containment for a set B in set A can be checked through relation $$W_{B,A}^{\Pi_{b \in B} r(b)} \stackrel{?}{=} acc(A) \bmod N,$$

by any verifier that has access to the correct accumulation value acc(A) and the public key. In the following discussion, the notation "mod N" is omitted when it is obvious from the context.

In the exemplary construction, accumulators are used over sets of elements belonging to different domains, as opposed to a single domain. For example, for each node of the suffix tree, we use a single accumulator representing the set of children of the node, its depth and its range. All of this information can be represented as unique 3k-bit primes, as required by the accumulator.

Security Properties

The representation acc(A) has the property that any computationally bounded adversary Adv who does not know $\phi(N)=(p-1)(q-1)$ cannot find another set of elements $A' \neq A$ such that acc(A')=acc(A), unless Adv breaks the factoring assumption. However, in order to achieve some more advanced security goals, the following is assumed:

Strong RSA Assumption—

Let k be the security parameter. Given a k-bit RSA modulus N and a random element $x \in Z^*_N$ there is no PPT algorithm that outputs y>1 and $\beta$ such that $\beta^y=x$ mod N, except with probability neg(k).

The security of the exemplary solution is based on the following result, extended for the case of subset containment.

Security of RSA Accumulator—

Let k be the security parameter, $h:\{0,1\}^{3k} \to \{0,1\}^k$ be a two-universal hash function, N be a (3k+1)-bit RSA modulus and $g \in QR_N$. Given N, g, a set of k-bit elements A and h, suppose there is a PPT algorithm that outputs B$\nsubseteq$A and W such that $W^{\Pi_{b \in B} r(b)}$=acc(A)mod N. Then there is a PPT algorithm for breaking the strong RSA assumption.

Authenticated Data Structure Scheme

Let D be any data structure supporting queries q. auth(D) denotes the authenticated data structure and d denotes the digest of the authenticated data structure, i.e., a constant-size cryptographic description of D.

An ADS scheme A is a collection of four PPT algorithms as follows:

1. $\{sk,pk\} \leftarrow genkey(1^k)$: Outputs secret and public keys sk and pk, given the security parameter k;

2. $\{auth(D),d\} \leftarrow setup(D,sk,pk)$: Computes the authenticated structure auth(D) and the respective digest of it, d, given a plain data structure D, the secret key sk and the public key pk;

3. $\{\Pi(q),\alpha(q)\} \leftarrow query(q, D,auth(D),pk)$: On input a query q on data structure D and auth(D) this algorithm returns the answer to the query $\alpha(q)$, along with a proof $\Pi(q)$;

4. $\{accept,reject\} \leftarrow verify(q,\alpha,\Pi,d,pk)$: On input a query q, an answer $\alpha$, a proof $\Pi$, a digest d and pk, it outputs either accept or reject.

Similarly, with definitions of signature schemes, an authenticated data structure scheme must satisfy correctness and security properties. Namely, (i) as long as the adversary does not tamper with the data and the algorithms of the scheme (therefore correct answers are returned), verification algorithms always accept; (ii) a computationally-bounded adversary cannot persuade a verifier (except with probability neg(k)) for the validity of an incorrect answer.

Accumulation Trees

The exemplary construction uses accumulation trees. See, e.g., C. Papamanthou et al., "Authenticated Hash Tables," *CCS*, 437-448 (2008) and/or United States Patent Publication No. 2011/0225429, entitled "Cryptographic Accumulators for Authenticated Hash Tables," each incorporated by reference herein. Compared to Merkle trees, accumulation trees are asymptotically more efficient and use different cryptography. In particular, they have proofs of constant size ($1/\epsilon$, for some $0<\epsilon<1$), instead of logarithmic size, and the internal nodes have degree $n^\epsilon$, instead of 2. For example an accumulation tree constructed for $\epsilon=\frac{1}{2}$ has 2 levels and $O(\sqrt{N})$ degree of internal nodes.

Accumulation Tree—

Let X be a set of N elements. There exists an authenticated data structure scheme AT={genkey, setup, query, verify} for verifying membership in set X such that: (1) It is correct and secure satisfies the Strong RSA Assumption; (2) Algorithm setup runs in O(N) time; (3) Algorithms query and verify run in O(1) time; (4) The membership proof has size O(1) and the authenticated data structure output by algorithm setup has size O(N). For a more detailed discussion of the accumulation tree primitive, see, for example, C. Papamanthou et al., "Authenticated Hash Tables," *CCS*, 437-448 (2008)

and/or United States Patent Publication No. 2011/0225429, entitled "Cryptographic Accumulators for Authenticated Hash Tables," each incorporated by reference herein.

Parallel Algorithms

The exemplary authenticated suffix tree construction makes extended use of the RSA accumulator and accumulation trees, as indicated above. This section shows how to parallelize operations on the RSA accumulator.

Parallel RSA Accumulator Setup

Recall that an RSA accumulation of a set of n elements $X=\{x_1, x_2, \ldots, x_n\}$ (for the purpose of this section, $x_i$ does not need to be prime) is the exponentiation $acc(X)= g^{x_1 x_2 \cdots x_n}$ mod N. Given the factorization $\phi(N)$, the value $acc(X)$ from above can be easily constructed in O(log n) parallel time using O(n/log n) processors and in the EREW model. To see that, use n/log n processors to compute the products of consecutive log n-sized sets of elements in O(log n) parallel time; This procedure will output a total of $w=O(n/\log n)$ products $y_1, y_2, \ldots, y_w$. Then use w/2 processors to compute $$\pi_i = y_{2i-1} y_{2i} \bmod \phi(N) \text{ for } i=1, \ldots, w/2$$

in O(1) parallel time. Then apply the same procedure to the output products $\pi_i$ (i=1, . . . , w/2) using w/4 processors. After log n parallel executions, $\Pi = \Pi_{i=1}^{n} x_i \bmod \phi(N)$ will be computed. Finally, one exponentiation $g^\Pi$ will give acc(X). Note that without the knowledge of $\phi(N)$, this algorithm would not work: The intermediate products could be O(n) bits, blowing up the per-level computation to linear (instead of constant). Therefore, Given $\phi(N)$, one can compute the exponentiation $acc(X)= g^{x_1 x_2 \cdots x_n}$ mod N in O(log n) parallel time, using O(n/log n) processors in the EREW model. The work of the parallel algorithm is O(n).

Parallel Suffix Products

The exemplary main scheme also uses the suffix accumulators $acc_i(X)$ of a sequence $X=\{x_1, x_2, \ldots, x_n\}$:

$$acc_i(X) = g^{x_i x_{i+1} \cdots x_n} \bmod N \text{ for } i=1, \ldots, n.$$

To compute the n suffix accumulators in parallel, the products $\Pi_i = \Pi_{i \leq j \leq n} x_j \bmod \phi(N)$ are first computed, which can be done with a parallel prefix sums algorithm since modular multiplication is associative, and then perform the exponentiations. Therefore, given $\phi(N)$, one can compute the exponentiations $acc_i(X) = g^{x_i x_{i+1} \cdots x_n}$ mod N for i=1, . . . , n in O(log n) parallel time, using O(n/log n) processors in the EREW model.

Parallel Path Prefixes

The above result can be extended to prefix accumulations on the paths of a tree. For a node v of a rooted tree T, let $x_v$ denote the element stored at v and path(v) denote the path of T between and including the root and v. The suffix accumulations $acc_v(T)$, for $v \in T$, are defined as follows:

$$acc_v(T) = g^{\Pi_{u \in path(v)} x_u} \bmod N.$$

These suffix accumulations can be computed in O(log n) parallel time, using O(n/log n) processors in the EREW model by performing a suffix accumulation over the Euler tour of the tree, where $x_v$ is accumulated when the tour encounters the left side of v and $x_v^{-1} \bmod \phi(N)$ when the tours encounters the right side of v. Therefore, given $\phi(N)$ and a general tree T of n nodes such that every node $v \in T$ has a value $x_v$, one can compute the exponentiations $g^{\Pi_{w \in path(v)} x_w}$ mod N for all $v \in T$ in O(log n) parallel time, using O(n/log n) processors in the EREW model.

Parallel Subtree Products

In the authentication of XML documents discussed below, "subtree products" on a tree need to be computed. Namely, given a general tree T of n nodes such that every node v has a value (weight) $x_v$, compute the accumulation value of all node v need to be computed:

$$acc_v(T) = g^{\Pi_{w \in subtree(v)} x_w} \bmod N,$$

where subtree(v) is the set of nodes contained in the subtree rooted on node v (including v). Note that in order to compute $acc_v(T)$ for all $v \in T$, it suffices to compute the products $\Pi_{w \in subtree(v)} x_w \bmod \phi(N)$ for all nodes $v \in T$.

Given $\phi(N)$ and a general tree T of n nodes such that every node $v \in T$ has a value $x_v$, one can compute the exponentiations $g^{\Pi_{w \in subtree(v)} x_w}$ mod N for all $v \in T$ in O(log n) parallel time, using O(n/log n) processors in the EREW model.

Parallel Accumulation Trees

Accumulation trees on a set of N elements (presented above) can be constructed in parallel. Specifically, to achieve that, the elements of the set are partitioned in O(N/log N) buckets of size O(log N) and the accumulations of the buckets is computed. These can be computed with O(N/log N) processors in O(log N) parallel time.

Next, for a fixed $\epsilon$, the accumulation tree is built on top of the B=N/log N buckets. Specifically, the accumulations ($O(B^{1-\epsilon})$ in total) of all internal nodes (of degree $O(B^\epsilon)$) at a specific level can be computed independently from one another. Therefore, the accumulation tree can be computed in $O(\log B^\epsilon) = O(\log N)$ parallel time using $O(B^{1-\epsilon} B^\epsilon / \log B) = O(N/\log N)$ processors, similarly with a Merkle tree. Therefore, Given $\phi(N)$, an accumulation tree over N elements can be constructed in O(log N) parallel time using O(N/log N) processors in the EREW model.

Certification of Suffix Trees

As indicated above, aspects of the present invention consider the verification of matches and mismatches of a pattern p in a text T. Answering pattern matching queries is an arduous task, if done naively. For example, given a pattern $p \in \Sigma^m$ and text $T \in \Sigma^n$, to answer a pattern matching query, one could sequentially test if p is a prefix of some suffix of T, for all suffixes of T. Such a successful test would imply a pattern match but would require O(n) work. However, with some preprocessing of O(n) work, one can organize patterns in a suffix tree, reducing the complexity of pattern matching query from O(n) to O(m).

Figure 3:
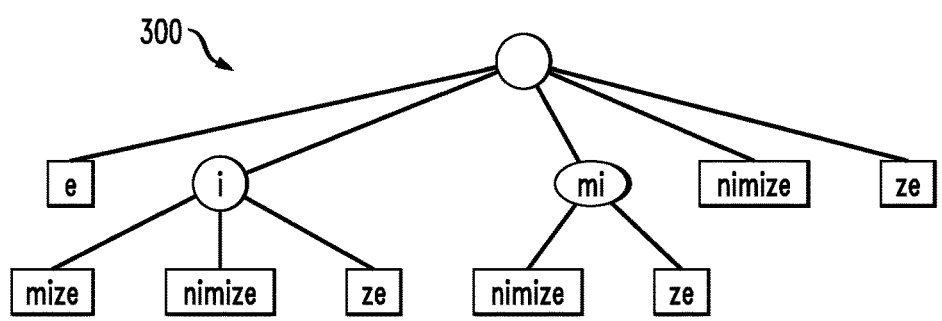
FIG. 3 illustrates an exemplary suffix tree for "minimize," where each suffix starts with a successive letter of the text.

Given a text $T \in \Sigma^n$, a suffix tree, represented with a rooted and directed tree $G=(V,E,T,\Sigma)$, is a data structure storing all the suffixes of T in a way that repeating patterns of suffixes are stored once and in an hierarchical way, where every leaf of the suffix tree corresponds to a suffix of the text T. This allows search time to be reduced to O(m) while its space complexity is still kept O(n). For example, the suffix tree 300 for the word "minimize" is depicted in FIG. 3 and discussed hereinafter. The following is a detailed description of the suffix tree $G=(V,E,T,\Sigma)$:

Suffixes

FIG. 3 illustrates an exemplary suffix tree for "minimize," where each suffix starts with a successive letter of the text T:

S[i]="minimize", S[2]="inimize", S[3]="nimize", S[4]="imize", S[5]="mize", S[6]="ize", S[7]="ze", S[8]="e".

As mentioned above, each leaf of G corresponds to a suffix of T thus G has n leaves; S[i] denotes the i-th suffix: Namely S[i]=T[i] . . . T[n], for i=1, . . . , n; E.g., in FIG. 3, S[4]="imize" while S[6]="ize". Repeating patterns are stored once.

Suffix Tree Nodes

Every node v∈V stores the following information: (a) the range $r_v=(s_v,e_v)$ of v, which corresponds to the start ($s_v$) and end ($e_v$) position of the string stored in v in the text (an arbitrary range is picked if v is associated with multiple ranges); (b) the depth $d_v$ of v, which corresponds to the number of characters from the root to v, i.e., the number of characters that are contained in the path in G that consists of the ancestors of v; (c) the sequel $c_v$ of v, which corresponds to the set of initial characters of the children of v. For example in FIG. 3, for the node v labeled "mi", it is $s_v=1$ and $e_v=2$ (or $s_v=5$ and $e_v=6$), $d_v=0$, $c_v=\{n,z\}$.

Searching in a Suffix Tree

A suffix tree can be used to search for a pattern p in T. Since all matching patterns must be a prefix of some suffix, the suffix tree search algorithm starts from the root and traverses down the tree until it reaches some node v where either a mismatch or a match is found. This search is performed by an algorithm (v,k,t)←suffixQuery(p,G), where G=(V,E,T,Σ) and (a) node v is the matching node, i.e., the node of the suffix tree where a match or a mismatch is returned; (b) index k, where $s_v \leq k \leq e_v$, is the matching index, namely the index within v where the last matching character occurs, with reference to the specific range ($s_v,e_v$). For matches, that index coincides with the index of the last character of p within v, whereas for mismatches it corresponds to the index of the last matching character of p; (c) index t, where t≤m, is the prefixsize. It corresponds to the size of the maximum matching prefix of p.

Certifying Pattern Matching Queries

Let T be a text of n characters over an alphabet E and let S[1], S[2], . . . , S[n] be its suffixes. Let G=(V,E,T,Σ) be the corresponding suffix tree and for all v∈V, let $r_v=(s_v,e_v)$, $d_v$ and $c_v$ be the range, the depth and the sequel of node v in G, as defined above. Let now $p=p_1p_2 \ldots p_m \in \Sigma^m$ be a pattern. Two results are provided to help design the exemplary authenticated data structure.

Pattern Match—

Let p∈Σ$^m$ be a pattern and let T∈Σ$^n$ be a text. There is a match of p in T if and only if there exist two suffixes of T, S[i] and S[j], with i≤j, such that S[i]=pS[j].

Pattern Mismatch—

Let p∈Σ$^m$ be a pattern, T∈Σ$^n$ be a text and G=(V,E,T,Σ) be the corresponding suffix tree. There is a mismatch of p in T if and only if there exist a node v∈G, an integer k∈|$s_v,e_v$| and an integer t<m in such that $S[s_v-d_v]=p_1p_2 \ldots p_tS[k+1]$ and $p_{t+1} \neq T[k+1]$ or $p_{t+1} \notin c_v$.

Alternatively, given a pattern p, one could access the suffix tree G and decide whether there is a match or mismatch. However, this would require having access to the whole data structure G, which is against the spirit of data outsourcing. Therefore, in order to achieve the exemplary complexity goals, a minimal set of properties should be extracted, that are efficiently and cryptographically checkable and at the same time completely characterize a match or a mismatch of a pattern in a text.

In FIG. 3, to prove the matching of the string p=inim, it suffices to output the suffixes S[2]=inimize and S[6]=ize. Note now that S[2]=pS[6]. This is a pattern match. More interestingly, it is desired to prove the mismatch of the string p=minia. This mismatch happens in the node v of the suffix tree labeled nimize. For that node, $s_v=3$ and $e_v=8$ and also $d_v=2$. Also note that the matching index k=4. It suffices to output the suffixes $S[s_v-d_v]=S[1]$=mininimize and S[k+1]=S[5]=nimize. Note now that the concatenation of its prefix mini (the prefix size is t=4) with the suffix S[5] is S[1], which is true. Also, $p_{t+1}=a \neq n$. This is a pattern mismatch. Finally, to prove the mismatch of the string p=mia, the node v of the suffix tree labeled mi is located. For that node, $s_v=5$ and $e_v=6$ (alternatively, $s_v=1$ and $e_v=2$) and also $d_v=0$. Also note that the matching index k=6. To prove the mismatch of the string p=mia, it suffices to output the suffixes $S[s_v-d_v]=S[5]$=mize and S[k+1]=S[7]=ze. Then, prove that the concatenation of its prefix mi with the suffix S[7] is S[5], which is true. However, note that processing is not done since k=$e_v$. The children set of v is {n,z}. Since a∉{n,z}, this is a mismatch.

Verifying Answers to Pattern Matching Queries

Primitives

Two RSA accumulators are employed. The first accumulator encodes information about a specific suffix S[i]. The first accumulator is referred to as a suffix accumulator. The second accumulator encodes information about a specific node v∈G of the suffix tree G=(V,E,T,Σ), referred to as a node accumulator. Finally, to verify specific suffix and node accumulators in an efficient way, an accumulation tree is used, as described above.

Suffix Accumulators—

The suffix accumulator encodes information related to a suffix S[i]=T[i]T[i+1] . . . T[n]. It accumulates the following three sets: (a) The set of position-character pairs corresponding to suffix S[i], i.e., $$X_{i1}=\{(\text{pos},i,T[i]), \ldots ,(\text{pos},n,T[n])\};$$

(b) The first character of S[i] (singleton set), i.e., $X_{i2}$=({(first, T[i])}; (c) The index of S[i] (singleton set), i.e., $X_{i3}$={(index,i)}. Note that the keywords pos, first and index are used as descriptors of the value that is accumulated. Also, without loss of generality one can view the elements in the sets $X_{i1}$, $X_{i2}$, $X_{i3}$ as distinct k-bit elements. The suffix accumulator for a specific suffix S[i] is defined as acc(A), where $A=X_{i1} \cup X_{i2} \cup X_{i3}$, where acc(A) is the accumulation value of set A, as defined above.

Node Accumulators—

Let T be the text over the alphabet Σ and let G=(V,E,T,Σ) be the suffix tree corresponding to text T. As discussed above, for every node v∈G, there are three kinds of information (values ($s_v,e_v$),$d_v$,$c_v$) that are important. It accumulates the following three sets, related to every node v∈G: (a) The range of v (singleton set), i.e., $Y_{v1}$={(range,$s_v,e_v$)}; (b) The depth of v (singleton set), i.e., $Y_{v2}$={(depth,$d_v$)}; (c) The sequel of v defined as the set of consecutive pairs $Y_{v3}$= {(sequel,$c_i,c_{i+1}$)|i=1, . . . , l−1} where c(v)={$c_1, c_2, \ldots, c_l$} is the alphabetic ordering of the first characters of v's children. The node accumulator for a specific node v∈G of the suffix tree is defined as acc(A), where $A=Y_{v1} \cup Y_{v2} \cup Y_{v3}$, where acc(A) is the accumulation value of set A, as defined above.

Authenticated Suffix Trees

The exemplary algorithms of the authenticated data structure scheme AST ( ) for a suffix tree comprise:

Algorithm {sk,pk}←genkey($1^k$): Pick a (3k+1)-bit RSA modulus N=pq, an element g∈$QR_N$, a two-universal hash function h:$\{0,1\}^{3k} \to \{0,1\}^k$ and a seed s for the random number generator that computes prime representatives r(.).

Also, instantiate an authenticated data structure scheme AT={genkey, setup, query, verify} based on an accumulation tree (see above). Next, execute {AT.sk, AT.pk}←AT.genkey($1^k$). Finally output the private and public keys sk={p,q,AT.sk} and pk={N,g,h,s,AT.pk}.

Algorithm {auth(D),d}←setup(D,sk,pk): Let D be the initial data structure consisting of the suffix tree G=(V,E,T,Σ) and the set of suffixes S[1], S[2], ..., S[n]. The authenticated data structure auth(D) is built as follows, and in three steps.

1. (Computing Suffix Accumulators) For each suffix S[i] of text T, build the suffix accumulator, as defined above. Let $acc_i$ be the suffix accumulator corresponding to suffix S[i], where i=1 ..., n. Also, for each suffix S[i], output the structure accumulator $t_i$, which is defined as $t_i=g^x$, where $$x=r(pos,i,T[i])\times \ldots \times r(pos,n,T[n]).$$

In essence, the structure accumulator is similar to the suffix accumulator, with the difference that it does not contain information about the index and the first character of the suffix it represents.

Parallel Algorithm. All n suffix/structure accumulators can be computed in O(log n) parallel time with O(n/log n) processors and O(n) work.

2. (Computing Node Accumulators) For each node v of the suffix tree G, build the node accumulator $acc_v$, as defined above.

Parallel Algorithm. To compute the node accumulators in parallel, group the nodes of the suffix trees in sets of nodes that have at most O(log n) children in total. There are O(n/log n) such sets. By assigning one processor per such set of nodes, the node accumulators can be computed in O(log n) parallel time using O(n/log n) processors.

3. (Computing Accumulation Trees) Consider the set of suffix accumulators S={$acc_1, acc_2, \ldots, acc_n$} and the set of node accumulators V={$acc_v$: v∈G}, as computed above. First, build one accumulation tree for set S by calling {auth(S),$d_S$}←AT.setup(S,sk,pk). Second, build another accumulation tree for set V by calling and {auth(V), $d_v$}←AT.setup(V,sk,pk).

Parallel Algorithm. The accumulation tree can be built in O(log n) parallel time using O(n/log n) processors and O(n) work.

The authenticated data structure auth(D) consists of the following objects: structure accumulators $t_1, t_2, \ldots t_n$; sets of suffix and node accumulators S and V; and accumulation trees auth(S) and auth(D). The digest d of the authenticated data structure consists of the pair of digests of the accumulation trees, namely d=($d_S$, $d_V$).

Let T be a text of n characters. The authenticated suffix tree data structure can be constructed in O(log n) parallel time using O(n/log n) processors in the EREW model.

FIG. 4A illustrates the three parties 110, 120, 130 of FIG. 1 configured to implement verification 400 of answers to pattern matching queries in accordance with aspects of the invention. Likewise, FIG. 4B illustrates exemplary pseudo code 450 implemented by the three parties 110, 120, 130 of FIG. 4A to perform verification of answers to pattern matching queries in accordance with aspects of the invention.

As shown in FIGS. 4A and 4B, the source 110 performs the following steps:
1. initialize RSA accumulators and verification information (e.g., accumulation trees);
2. Computes node and suffix accumulators verification information (e.g., accumulation trees);
3. Send Text, Suffix Tree and accumulation values to Server 120;
4. Publish pk and verification (e.g., accumulation tree) digests The verification may comprise an accumulation tree (AT) or any other public key authentication scheme, such as digital signatures, Merkle Trees and publishing the accumulation values at a (secure) public access repository that is authenticated by the source.

As shown in FIGS. 4A and 4B, the server 120 and the client 130 then interact by performing the following steps:
5. Client 130 issues query q to server 120;
6. Server 120 computes answer α from suffix tree and runs Query( ), discussed hereinafter, to produce Π. Sends α,Π to Client 130;
7. Client 130 runs Verify( ), discussed below, and outputs 0/1

Query Verification

The algorithms are now described for constructing proofs and for verifying the correctness of the answers to pattern matching queries, i.e., matches and mismatches. Let p∈Σ$^m$ be the queried pattern of size m. If there is a match of p in T then, it suffices to prove the existence of two suffixes S[i] and S[j] such that S[i]=pS[j] and i≤j (see FIG. 5A). This is done by using the accumulation tree on set S and the set of structure accumulators (see details below). Proving a mismatch is however more complicated. (see FIG. 5B), The description of the exemplary algorithms show that the authenticated data structure constructed above allows these tasks to be achieved efficiently:

Algorithm {Π(q),α(q)}←query(q,D,auth(D),pk): Let q=p be the queried pattern of size m. Consider the following cases.

Proving a Match—

In this case, the answer to the query q is α(q)="match at i". There are suffixes S[i] and S[j] such that S[i]=pS[j] and i≤j. The proof Π(q) for a match therefore consists of the following items:
1. Indices i and j, along with the characters T[i] and T[j];
2. Structure accumulators $t_i$ and $t_j$;
3. Suffix accumulators $acc_i$ and $acc_j$ along with accumulation tree proofs $Π_i$ and $Π_j$ for the statements $acc_i$∈S and $acc_j$∈S, which are output by calling algorithm {$Π_l$, "yes"}←AT.query($acc_l$,S,auth(S),pk) for both l=i,j.

Proving a Mismatch—

In this case, the answer to the query q is α(q)="mismatch". Let v,k,t be the matching node of the suffix tree, the matching index and the prefix size respectively output by algorithm (v,k,t)←suffixQuery(p,G). Let also ($s_v,e_v$), $d_v$ and $c_v$ be the range, the depth and the sequel of v. Set i=$s_v$−$d_v$ and j=k+1. The proof Π(q) for a mismatch contains the following objects:
1. Matching index k, prefix size t;
2. Node accumulator $acc_v$ and an accumulation tree proof $Π_v$ for the statement $acc_v$∈V, output by calling algorithm {$Π_v$,"yes"}←AT.query($acc_v$,V,auth(V),pk);
3. A subset witness $W_{B,A}$ as in Relation 1, where $$B=\{(range,s_v,e_v),(depth,d_v)\} \text{ and}$$

$$A=B\cup\{(sequel,c_i,e_{i+1}):i=1,\ldots,l-1\};$$

4. Range ($s_v,e_v$) and depth $d_v$;
5. Indices i and j, along with the characters T[i] and T[j];
6. Structure accumulators $t_i$ and $t_j$;
7. Suffix accumulators $acc_i$ and $acc_j$ along with accumulation tree proofs $Π_i$ and $Π_j$ for the statements $acc_i$∈S and $acc_j$∈S, which are output by calling algorithm (Π$_l$, "yes")←AT.query($acc_l$,S,auth(S),pk) for both l=i,j;

8. When $k=e_v$, the proof also contains a subset witness $W_{P,C}$ as in Relation 1, where $P=\{(\text{sequel},c_j,c_{j+1})\}$ such that $c_j < p_{l+1} < c_{j+1}$ and $C=\{(\text{sequel},c_i,c_{i+1}):i=1,\ldots,l-1\}$.

Algorithm {accept,reject}←verify(q,α,Π,d,pk): Recall that $p=p_1 p_2 \ldots p_m$ is the queried pattern and the digest is $d=\{d_S,d_V\}$. Consider the following cases.

Verifying a Match—
Parse the proof Π as $$i,j,T[i],T[j],t_i,t_j,\text{acc}_i,\text{acc}_j,\Pi_i,\Pi_j.$$

It is α(q)="match at i". Output accept if all the checks below are true, else output reject:

1. accept←AT.verify(l,$\text{acc}_l$,$\Pi_l$,$d_S$,pk) for both l=i,j. This assures there are valid suffixes whole suffix accumulators are $\text{acc}_i$ and $\text{acc}_j$;

2. $t_l^x = \text{acc}_l$, where $x=r(\text{first},T[l])r(\text{index},l)$ for both l=i,j. This assures that the structure accumulator corresponding to suffix S[l] is $t_l$, for both l=i,j;

3. $t_i = t_j^x$, where $x=\Pi_{l=1}^m(\text{pos},i+l-1,p_l)$. This verifies the property from Lemma 10 that S[i]=pS[j].

Verifying a Mismatch—

In this case, the answer to the query is α="mismatch". Parse the proof n as k,t,$\text{acc}_v$,$\Pi_v$,$W_{B,A}$,$(s_v,e_v)$,$d_v$,i,j,T[i],T[j], $t_i,t_j,\text{acc}_i,\text{acc}_j,\Pi_i,\Pi_j$. In the case that $k=e_v$, the proof also contains $W_{P,C}$ and the element $(\text{sequel},c_j,c_{j+1})$. Output accept if all the checks below are true, else output reject:

1. accept←AT.verify(v,$\text{acc}_v$,$\Pi_v$,$d_v$,pk). This assures that there is a node of the suffix tree with node accumulator $\text{acc}_v$;

2. $W_{B,A}^x = \text{acc}_v$, where $x=r(\text{range},s_v,e_v)r(\text{depth},d_v)$. This assures that the range and the depth of v are $(s_v,e_v)$ and $d_v$ respectively;

3. $i=s_v-d_v$ and $s_v \le k \le e_v$ and $j=k+1$ and $t<m$. These are necessary conditions from Lemma 11;

4. accept←AT.verify(l,$\text{acc}_l$,$\Pi_l$,$d_S$,pk) for both l=i,j. This assures there are valid suffixes whole suffix accumulators are $\text{acc}_i$ and $\text{acc}_j$;

5. $t_l^x = \text{acc}_l$, where $x=r(\text{first},T[l])r(\text{index},l)$ for both i=i,j. This assures that the structure accumulator corresponding to suffix S[l] is $t_l$, for both l=i,j;

6. $t_i = t_j^x$, where $x=\Pi_{l=1}^t r(\text{pos},l+1,p_l)$. This verifies the property from Lemma 11, i.e., that $S[i]=p_1 p_2 \ldots p_t S[j]$;

7. The final condition that needs to be checked depends on the value of k. If $k<e_v$, then the check that should hold true is $p_{t+1} \ne T[j]$. Else, if $k=e_v$, the check that should hold true is $c_j < p_{t+1} < c_{j+1}$ and $W_{P,C}^x = \text{acc}_v$, where $x=r(\text{sequel},c_j,c_{j+1})$, which checks the condition $p_{t+1} \notin c_v$.

Figure 5A:
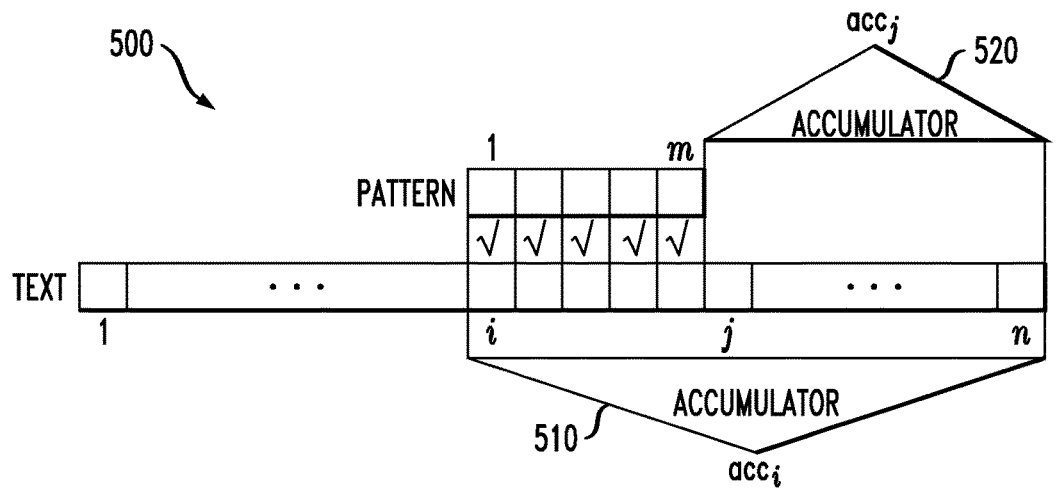
FIGS. 5A and 5B illustrate a pattern match and a pattern mismatch, respectively, using accumulators in accordance with aspects of the invention.
Figure 5B:
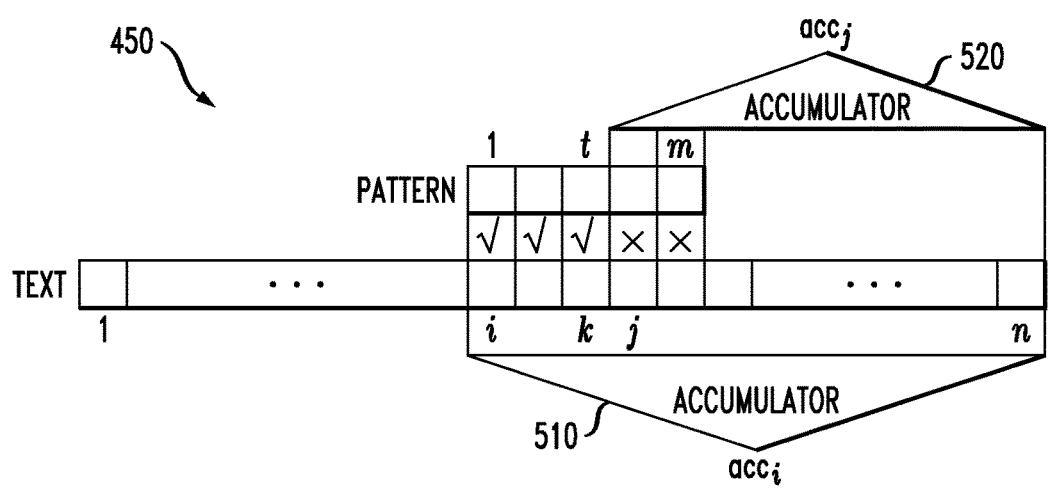

FIGS. 5A and 5B illustrate a pattern match 500 and a pattern mismatch 550, respectively, showing the relation of variables k and t. FIG. 5A illustrates a pattern matching 500 in the exemplary scheme for pattern p (|p|=m), using suffixes S[i] and S[j], where S[i]=pS[j]. Accumulator $\text{acc}_i$ 510 is associated with the i-th suffix and accumulator $\text{acc}_j$ 520 is associated with the j-th suffix. FIG. 5B illustrates a pattern mismatch 550 in the exemplary scheme, using suffixes S[i] and S[i], where $S[i]=p_1 p_2 \ldots p_t S[j]$ and $t<m$.

Let T be a text of n characters over an alphabet Σ of size σ and let p be a pattern of m characters over Σ. Then there exists an ADS scheme APM={genkey,setup,query,verify} for verifying pattern matching queries (match and mismatch) of pattern p on text T such that: (1) It is correct and secure and assuming the hardness of the Strong RSA Assumption; (2) The running time of algorithm setup is O(n); Moreover algorithm setup can be implemented in parallel O(log n) time using O(n/log n) processors in the EREW model; (3) The running time of algorithm query is O(1); (4) The running time of algorithm verify is O(m); (4) The size of the proof is O(1); (5) The space of the authenticated data structure is O(n).

Extensions—

The exemplary solution can be extended to support queries that ask for all the occurrences of the pattern in the text. This is achieved by defining and verifying—through appropriate encoding in the RSA accumulation values—some additional relations. In particular, the range pairs $r_v^i = (s_v^i, e_v^i)$, is associated with tree node v, i=1, . . . , t, for all the t occurrences of the string stored in v. As another extension, patterns containing a constant number of wildcards are supported by partitioning the search path into segments associated with simple patterns and verifying each segment individually.

Verifying Exact-Path XML Queries

XML is a popular data representation model for exchanging, distributing, storing and querying structured data sets and, as such, the problem of efficient authentication of XML queries has great practical value.

Figure 6:
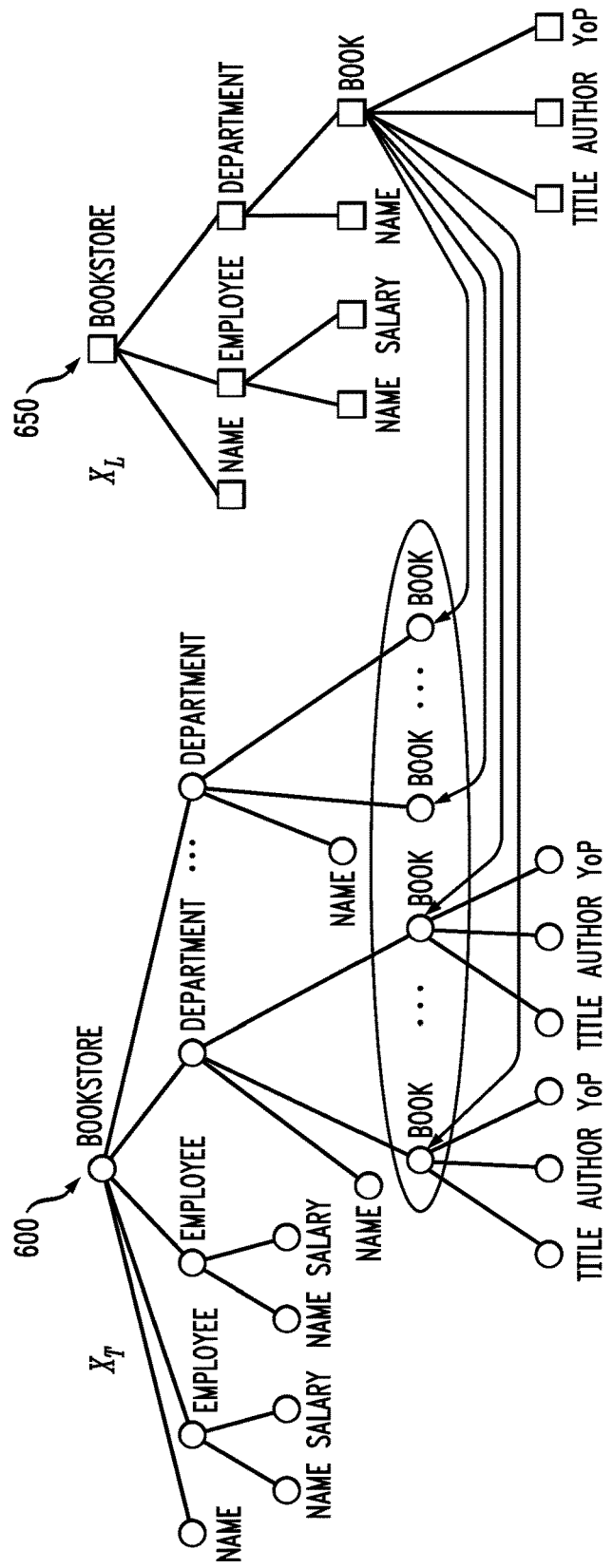
FIG. 6 illustrates a simplified tree-based representation of XML documents.

An XML document X consists of n elements $e_1, \ldots, e_n$ that have a hierarchical structure with elements related to others via sub-element relations. A natural abstract representation of X is a tree denoted by $X_T$ with elements e as nodes and edges denoting the sub-element relations. Each element has a label that distinguishes its data type, attributes and corresponding attribute values and actual textual content (which can simply be viewed as an additional attribute). Finally, elements can also be related to other elements via reference attributes in which case $X_T$ is no longer a tree but a directed graph. Here, no reference attributes are assumed, thus $X_T$ is indeed a tree. FIG. 6 illustrates a simplified tree-based representation of XML documents. As shown in FIG. 6, a Tree $X_T$ (600) contains all the elements of XML document X. Element attributes can be included as a different type of node, directly below the corresponding element. A trie $X_L$ (650) contains all the distinct label paths that appear at X. Observe how each node has pointers to all the corresponding element nodes in $X_T$.

Each node is reachable by a single label path starting from the root of $X_T$ and traversing the tree concatenating the label encountered on each level at its ancestor, i.e., element e with label $l_h$ is reachable by label path $l_1, \ldots, l_h$ which corresponds to a path on $X_T$ starting from the root node and always choosing the appropriate ancestor of e. In general many elements may share the same label path.

Finally, one should keep in mind that an XML document X is constructed under specifications dictated by a related XML schema, e.g., a document type definition or DTD representation specifying what types of elements can appear, with what attributes etc. An important element of some of exemplary schemes will be the DOMHASH authentication technique for XML documents, which is very similar to Merkle-like hashing performed on the XML document tree. See, e.g., H. Maruyama et al., "Digest Values for DOM (DOMHASH)," RFC 2803 (Apr. 2000), incorporated by reference herein.

XML Queries—

The details of querying an XML document are abstracted and assume that an XML query returns a subset of the elements of $X_T$. Generally speaking, a path query is a regular expression over the alphabet L of valid labels and its answer includes all nodes that are reachable by label paths that conform to the query regular expression, along with the subtrees in $X_T$ that have these nodes as roots. An exact path query is related to a label path L of length m and as such it belongs to $L^m$ and will return a set of nodes that correspond to L with the respective subtrees that have these nodes as roots. The above description of XML path queries is an abstraction that captures the basic notion of path query as identified in various XML query languages (XPath, XML-QL, etc.). Finally, a more elaborate type of query is a path query with attribute predicates where a path query is followed by a predicate defined over an attribute value pair, the answer of which includes all elements of $X_T$ that are reachable by the regular expression of the path query and satisfy the given attribute-value predicate, as well as all the nodes in the subtrees of $X_T$ that have these nodes as roots. Exact path queries with and without predicates are considered. As an example, a query of the form bookstore\department\book will return all the books that appear in $X_T$ as shown in FIG. 6 with the corresponding subtree of each book element (i.e., nodes title, author, YoP).

As before, a three party model is assumed with a source 110 that owns a document X that is hosted and processed by an untrusted server 120. A client 130 who trusts the source 110 but not the server 120 issues queries and obtains appropriate portions of X along with a proof of correctness that is verifiable by the client 130 and assures, both that all elements in the answer conform to the query specifications and that all of the elements of X that conform to the query are in the answer. Furthermore, one exemplary scheme allows for documents that dynamically change under element insertions, deletions and attribute changes maintaining update and verification time efficiency, making our construction directly applicable to real-world XML authentication settings.

Consider Exact-Path Queries Over XML Documents.

Data and Query Model—

The standard tree-based representation is used for XML data. An XML document X consists of n elements $e_1, \ldots, e_n$ organized in a hierarchical structure via sub-element relations. Elements' hierarchical structure imposes a well-defined representation of X as a tree $X_T$ having elements as nodes and sub-element relations expressed by edges. Each element has a label that distinguishes its data type, attributes and their corresponding attribute values and actual textual content (which can be simply viewed as an additional attribute). Without loss of generality, it is assumed that each element of $X_T$ is associated with a unique numerical identifier stored as an element attribute. FIG. 6 provides a simplified such tree-based representation.

Each node e in $X_T$ is defined (or reachable) by a single label path that is the concatenation of the labels of e's ancestor nodes in the order that they must be traversed starting from the root of $X_T$ in order to reach e. In general, many elements may share the same label path. The details of the querying process of an XML document are abstracted away by considering generic path queries that return a subset of the elements of $X_T$ (in fact, a forest of subtrees in $X_T$). A path query is generally a regular expression over the alphabet L of valid labels returning all nodes reachable by those label paths conforming to the query, along with the subtrees in $X_T$ rooted at these nodes. An exact path query is related to a label path L of length m, i.e., $L \in L^m$, returning the subtrees reachable in $X_T$ by L. As an example, a query of the form \bookstore\department\book will return all the books that appear in $X_T$ as shown in FIG. 6 with the corresponding subtree of each book element (i.e., nodes title, author, YoP).

Certifying Exact Path XML Queries

Using the authentication via certification framework, it is desired to identify those relations amongst the data items in an XML document that are sufficient for efficiently certifying the correctness of exact-path XML queries in a parallelizable manner and while keeping the total number of storage linear. One exemplary approach is to decouple locating the queried elements from validating of their contents. This is achieved through a direct reduction to our (authenticated) suffix tree: Given an XML document X in its tree-like representation $X_T$, a trie $X_L$ is constructed that stores all the distinct label paths that appear in $X_T$. In relation with the previous construction, $X_L$ can be viewed as an uncompressed suffix tree with the alphabet being the element label space L associated with X and the "text" over which it is defined being all label paths in $X_T$. Each node in $X_L$ is associated with a label path from the space of valid label paths according to $X_T$ and, through back pointers, it is also associated with the set of elements in $X_T$ that are reachable by this label path.

With this transformation, trees $X_T$ and $X_L$ facilitate the efficient certification of exact-path queries. Three types of certification relations are defined, encoded and authenticated:

1. Label Paths:

This relation maps nodes in $X_L$ with their corresponding label paths. The results for pattern matching discussed above are employed except that is no longer a tree defined over all possible suffixes of a text, suffix accumulators are not relevant; instead, label accumulators are used.

2. Element Mappings:

This relation maps nodes in $X_L$ with the corresponding elements in $X_T$ that are reachable by the same label path (associated with these nodes).

3. Subtree Contents:

This relation maps nodes in $X_T$ with the elements (and their attributes) in $X_T$ that belong in the subtrees in $X_T$ defined by these nodes.

As before, these certification relations will be authenticated by computing accumulation or hash values over appropriate sets of data objects related to the nodes $X_L$ and $X_T$. All involved computations (including constructing $X_L$) at setup will be parallelizable. Finally, although the above relations are defined over $O(n^2)$ total data objects, the actual total storage required is linear in the size n of X.

Primitives

Notation—

Consider trees $X_r$ and $X_L$ where $|X_T|=n$ and $|X_L|=O(n)$ and let d denote their (equal) depths. Let L denote an exact-path query L of size m reaching t elements in $X_T$, which in turn define subtrees of total size s<n with s>t. $e_{id}$ denotes the identifier, $A_e=\{(a_i,\beta_i)|i=1,\ldots,|A_e|\}$ denotes the attribute values, lb(e) denotes the label, and $C_e=\{c_i|i=1,\ldots,|C_e|\}$ denotes the children of element e in $X_T$. For any node $v \in X_L$, $L_v$, lb(v), $C_v$, and $E_v$ denotes its label path, label, children set, and respectively the set of elements $e_i$ in $X_T$ that are reachable by $L_v$.

Node Accumulators—Label paths and element mappings in $X_L$ are both encoded using node accumulators, each defined for a node $v \in X_L$ as follows. v is associated with three sets of data objects: (a) The label path $L_v$ of v, let $Y_{v1}=\{(label,i,l_i):i=1,\ldots,|L_v|\}$; (b) The label sequels of v is sequence (lb($c_1$), lb($c_2$), ..., lb($c_{|C_v|}$)) of the alphabetically ordered labels of v's children; let $Y_{v2}=\{(sequel,lb(c_i), lb(c_{i+1})):i=1,\ldots,|C_v|-1\}$. (c) The XML elements is the set $E_v$ of elements of $X_T$ that correspond to $L_v$; let $Y_{v3}=\{(elem, sl(e_i)):i=1,\ldots,|E_v|\}$. Then, the node accumulator for node $v \in X_L$ is defined as acc(A), where $A=Y_{v1} \cup Y_{v2} \cup Y_{v3}$, where acc(A) is the accumulation value of set A, as defined above.

Subtree Labels—

Subtree contents in $X_T$ are encoded using a special type of node-specific cryptographic values. If h is a cryptographic collision-resistant hash function, then for any $e \in X_T$ we let h denote the hash content of e $$h_e = h(e_{id} P(a_1, \beta_1) P \ldots P(a_{|A_e|}, \beta_{|A_e|})).$$

Then, $e \varepsilon X_T$ define two different ways for recursively computing node-specific subtree labels sl(e) that aggregate the hash labels of all the descendant nodes of e in $X_T$:

1) Hash-Based: If e is leaf in $X_T$ then $sl_1(e) = h_e$, otherwise $sl_1(e) = h(h_e Psl_1(c_1) \ldots Psl_1(c_{|C_e|}))$;

2) Accumulation-Based—$sl_2 = acc(Z_e)$ where if e is leaf then $Z_e = h_e$, otherwise $$Z_e = \{h_e, Z_{c_1}, \ldots, Z_{c_{|C_e|}}\};$$

Choosing sl between $sl_1$ or $sl_2$ provides an interesting trade-off between cryptographic efficiency and optimal parallelism: With $sl_1$, answer verification involves O(m+t) exponentiations and O(s) hash operations but optimal parallelism can be achieved only for trees of depth d=O(log n); with $sl_2$, answer verification involves O(m+s) exponentiations but optimal parallelism can be achieved unconditionally.

Authenticated XML Documents

ADS Scheme—

AXML (Definition) for exact path queries over XML documents. The genkey( ) algorithm is the same as the corresponding algorithm of the text pattern matching scheme AST described above and thus its description is omitted.

Algorithm {auth(D),d}←setup(D,sk,pk): Let D be the initial data structure $X_T$. The authenticated data structure auth(D) is built in three steps which can be performed in optimal parallel way, if $sl = sl_1$ but d=O(log n) or if $sl = sl_2$.

1. Construct $X_L$, the tree containing all distinct paths appearing in the $X_T$.

2. (Computing subtree labels) Compute the subtree label of each element $e \in X_T$ in a bottom up way starting from the leaves. The values sl(e) are stored locally on the nodes of $X_T$. (When $sl = sl_1$ this computation cannot be parallelized as a hash chain of size O(n) is traversed in the worst case.)

3. (Computing node accumulators) For each node v of the tree $X_L$, build the node accumulator $acc_v$, as defined above. Also, for each node v, output the structure accumulator $t_v$, which is defined as $t_v = g^x$, where $x = \prod_{i=1}^{|C_v|-1} r(\text{sequel}, lb(c_i), lb(c_{i+1}))$. The structure accumulator contains information on the children of v and will be useful to verify label path and elements of v. Finally, for each node, also output the path structure accumulator $s_v$, which is defined as $s_v = g^x$, where $$x = \prod_{i=1}^{|C_v|-1} r(\text{sequel}, lb(c_i), lb(c_{i+1})) \prod_{i=1}^{|E_v|} r(\text{elem}, sl(e_i)).$$

This is another kind of structure accumulator that contains all information in v except for the label path $L_v$.

4. (Computing accumulation tree) This step is similar to the previous construction but with a single accumulation tree over the set $V = \{acc_v | v \in X_L\}$.

The authenticated data structure auth(D) consists of the following objects: tree $X_L$; structure accumulators $t_v, s_v, \forall v \in X_L$; the set of node accumulators V; and accumulation tree auth(V). The digest d of the authenticated data structure consists of the digest of the accumulation tree, i.e., $d = d_V$.

Verifying Path Queries—

Let $L \in L^m$ be the queried label path of a query q with length m.

Algorithm {Π(q),α(q)}←query(q, D, auth(D),pk): Consider the following cases.

Proving the Answer of a Valid Path.

In this case, the answer α(q) consists of all the elements $e_i$ in the document that have label paths corresponding to L as well as the subtrees of $X_T$ that have $e_i$ as roots. It should be noted that since the result consists of a forest of subtrees, their structure must also be explicitly part of α(q), i.e., the parent-children relations of elements are explicitly part of the answer. The proof Π(q) for a match therefore consists of the following items:

1. Node accumulator $acc_v$ and corresponding structure accumulator $t_v$ where $v \in X_L$ corresponds to path L;

2. Accumulation tree proof Π, for the statement $acc_v \in V$ which is produced as output by calling algorithm {Π$_v$, "yes"}←AT.query($acc_v$,V,auth(V),pk).

Proving the Answer of an Invalid Path.

If query q contains a label path L that does not appear in the document (it might even be invalid under the corresponding XML scheme), the answer is α(q)="invalid_path". Let v be the node of $X_L$ that corresponds to the longest prefix of L that does appear in $X_T$, i.e. $\lambda = l_1, l_2, \ldots, l_\kappa$ where $\kappa < |L|$. The proof Π(q) for a mismatch contains the following objects:

1. Index κ corresponding to length of λ;

2. Node accumulator $acc_v$ along with structure accumulator $s_v$ and an accumulation tree proof Π$_v$ for the statement $acc_v \in V$, output by calling algorithm {Π$_v$,"yes" }←AT.query($acc_v$,V,auth(V),pk);

3. Subset witness $W_{pA}$ as in Relation 1, where P={(sequel, $lb(c_j),lb(c_{j+1})$)} such that $lb(c_j) < l_{\kappa+1} < lb(c_{j+1})$ and $A = Y_{v1} \cup Y_{v2} \cup Y_{v3}$.

4. Labels $lb(c_j)$, $lb(c_{j+1})$ as defined in the previous step.

Algorithm {accept, reject}←verify(q,α,Π,d,pk): Consider the following cases.

Verifying a Valid Path Response.

Parse α(q) and reconstruct the trees $T_1, \ldots, T_{|E_v|}$. For each T with root $e_i$, compute the $sl(e_i)$. Output accept if all the checks below are true, else output reject:

1. accept←AT.verify(v,$acc_v$,Π$_i$,d$_T$,pk). This assures v is valid node of $X_L$ with node accumulator $acc_v$;

$$t_v^x = acc_v, \text{ where} \qquad 2$$

$$x = \prod_{i=1}^{|L_v|} r(\{(\text{label}, \text{index}, l_i) \prod_{i=1}^{|E_v|} r(\text{elem}, sl(e_i)).$$

This assures that the path label of v is L, and the subtree labels of all the elements of $X_T$ that correspond to L are $sl(e_i)$ for $i=1, \ldots, |E_v|$. Moreover, assuming $sl(e_i)$ are securely computed (either by a secure hash function or a cryptographic accumulator), the correct values of all attributes of nodes $e_i$ and the presence in α(q) of all nodes in the subtrees that have $e_i$ as roots (as well as their attribute values) is verified.

Verifying an Invalid Path Response.

In this case, the algorithm is similar to the corresponding verification algorithm for the text pattern matching scheme.

The answer is α="invalid_path". Let λ denote the κ-length prefix of L that appears in the document i.e. $\lambda=l_1, \ldots, l_\kappa$. Output accept if all the checks below are true, else output reject:

1. κ<|L|. This assures that λ is a prefix of L.
2. accept←AT.verify(v,acc$_v$,Π$_v$,d$_v$,pk). This assures that ∃v∈X$_L$ with node accumulator acc$_v$;
3. $s_v^x$=acc$_v$, where $\Pi_{i=1}^\kappa$r({(label,index,l$_i$). This assures that the label path associated with v is λ.
4. lb(c$_j$)<l$_{k+1}$<lb(c$_{j+1}$) and W$_{P,A}^x$=acc$_v$, where x=r(sequel, lb(c$_j$),lb(c$_{j+1}$)), which checks that l$_{k+1}$ is not a valid sequel label of A in X$_1$ and thus the label path $l_v, \ldots, l_\kappa$ does not appear in X$_T$.

Let X$_T$ be an XML document of size n and depth d with element labels from L. There exists an ADS scheme AXML=(genkey, setup, query, verify) for verifying exact label path queries on X$_T$ such that: (1) It is correct and secure assuming the hardness of the Strong RSA Assumption and, for the hash based construction, the security of the cryptographic hash function; (2) Algorithm setup runs in O(n) time and, when d is O(log n) or the construction is accumulation based, can be implemented in parallel O(log n) time with O(n/log n) processors in the EREW model; (3) Algorithm query runs in O(1) time; (4) Algorithm verify runs in O(s+m) time and performs O(m+t) exponentiations in the hash-based construction or O(m+s) exponentiations in the accumulation-based construction, where s is the total size of the subtrees in the answer and t is the length of the query label path; (5) The size of the proof is O(1); (6) The space of the authenticated data structure is O(n).

Extensions

Exact Path Queries Over Dynamic XML Documents.

A scheme that supports queries over documents that can change under element insertions, deletions and attribute changes is presented. The exemplary scheme provides updates in constant time making it ideal for dynamic content with frequent changes. Content integrity is achieved by constructing an element accumulator for each e∈X$_T$ (and an accumulation tree on top of them) and by relating only element id's with a node in X$_L$. Thus, updates only affect a constant number of accumulation values in X$_T$ and X$_L$ (at most, the affected element and its parent) and accumulation values and trees can be updated in O(1). Finally, some changes are made to the algorithm and two separate algorithms update and refresh are added to the basic scheme (with the first one running at the source and the second at the server). The trade-off is increased query time and proof size (both of which are linear to the answer size).

Assume the same setting as above but now X$_T$ can change under element insertion, deletion and attribute change. There exists an ADS scheme AXML for verifying exact label path queries on X$_T$, having two additional algorithms (update, refresh). Asymptotic results hold for AXML with the following changes: (1) The running time of algorithm query is O(s); (2) The running time of algorithms update and refresh is O(1) for a single element update; (3) The proof size is O(s);

Exact Path Queries with a Predicate Attribute.

Under many standardized query languages, an XML query q can be related not only to a label path L but also to a predicate p that is defined over element attribute values. The answer of such a query is all the nodes e$_i$ in the document that are reachable by path L and satisfy the attribute predicate P along with the subtrees of X$_T$ with these nodes as roots. For the remaining discussion, it is assumed XML documents that make use of element attributes when possible.

In order to construct an efficient scheme that supports such queries, techniques are used for authenticated set operations, namely efficient authenticated set intersection presented at C. Papamanthou et al., "Optimal Verification of Operations on Dynamic Sets," Proc. CRYPTO 2011, 91-110 (2011) and/or United States Patent Publication No. 2012/0030468, entitled "System and Method for Optimal Verification of Operations on Dynamic Sets," each incorporated by reference herein. The cryptographic tools necessary are again accumulators, but of a different type, namely bilinear accumulators. C. Papamanthou et al. present an efficient scheme for authenticated set intersection computation where the only information about the set the client needs is their accumulation values. Therefore, node accumulators are changed to contain the accumulation vales of the set of id's of elements e$_i$. Furthermore, additional relations are defined that are authenticated, namely for every possible attribute-value combination, the element id's of all e∈X$_T$ are accumulated that have the particular value for this attribute. From this, upon receiving the answer to a query q related to label path L and predicate P for attribute a and value v, the client 130 can use previously describer techniques to verify the accumulation value of the set of id's of all elements that satisfy L and likewise for P. After this, the client 130 can use efficient verification techniques presented in C. Papamanthou et al. to verify he receives as α(q) exactly the intersection of the two sets.

Assume the same setting as above and define A, B the sets of attribute tags and attribute values for X$_T$ respectively. Also let P:A×B→{0,1} be an attribute predicate. There exists ADS scheme AXML for verifying exact label path queries extended with attribute predicates such that the above results hold with the following changes: (1) It is secure assuming the hardness of the q-strong bilinear Diffie-Hellman assumption; (2) The running time of algorithm query is O(v log$^3$v+n$^\varepsilon$ log n) for 0<ε<1 constant and v=max{v$_1$,v$_2$} where v$_1$ is the number of elements satisfying P and likewise v$_2$ for L; (3) The size of the proof is O(s).

Extensions and Improvements

Accommodating Additional Query Types

As mentioned above, the text pattern matching construction can be easily extended to support queries that ask for all the occurrences of the pattern in the text. This is achieved by defining and verifying—through appropriate encoding in the RSA accumulation values—some additional relations. For every suffix tree node v we also accumulate set K containing the range pairs r$_v^{(i)}$=(s$_v^{(i)}$,e$_v^{(i)}$) for i=1, ..., t where t is the number of occurrences of the string stored in v. Thus, for pattern p related to a text contained in v the number of occurrences should be t and all of them can be verified be appropriate exponentiation and equality checking. The above also holds if v contains a suffix of p as the number of occurrences of this final part will define the number of occurrences of p (due to the suffix tree structural properties). The additional proof size and verification time overhead is only additively linear in t.

Another interesting extension that can be supported, concerns patterns containing a constant number of wildcards (e.g., * or ?). Assume a query pattern p containing a constant number k of wildcards. This pattern can be split to k+1 partitions p$_1$, ..., p$_{k+1}$ according to the placement of the wildcards. Following that a separate proof and verification procedure can be held for each of p$_i$. If the answer for p is claimed by the server to be a match then verification includes, verification for the fact that for each of p$_i$ the answer is also a match and that the (verified) positions of $p_i$ are compatible with p (i.e. for i=1, . . . , k+1 the start of $p_i$ is equal to the end of $p_{i+1}$+1, start of $p_1$ is greater than 0 and end of $P_{k+1}$ is lower than n). Only if the above conditions hold simultaneously the verification procedure outputs accept. In case of a mismatch, there are two distinct ways for the server 120 to convince the verifying user 130. In case the proof contains an accepting proof of any $p_i$ and mismatch as an answer, then the verifier 130 accepts mismatch as a valid answer for p. Otherwise, the client 130 must verify that the answer is match for all $p_i$ and that the positioning of a consecutive pair $p_i$, $p_{i+1}$ of them (considering—possibly—multiple occurrences) is invalid. Using the previous extension, this extra step can be achieved by $t_i \cdot t_{i+1}$ comparisons where $t_i$ is the number of occurrences of $p_i$. Assuming $t_i$=t for all $p_i$ this gives a verification time overhead $O(t^2)$ that can drop to O(t) with some additional logarithmic time processing at the server (namely sorting values $t_i$ for each of the consecutive pairs). Overall, the verification time and proof size for both cases should be O(m+t) where m is the pattern size and t is the maximum number of occurrences for all $p_i$.

Bandwidth-Sensitive Scheme

A more lightweight construction is presented, based on only two accumulators, without need for the construction of an additional accumulation tree over the accumulation values of suffixes and nodes. The trade-off is that the number of possible witnesses in this alternative scheme is quadratic (recall that witness pre-computation at the source takes time linear to the text size). Alternatively, the scheme can be utilized with on-line witness computation at the server per query. This would make the setup phase much faster but would incur an O(n) query answering overhead. However, since for the text pattern matching construction the content is static, such witnesses can be stored at the server (or even computed at an out-of-band procedure). Moreover, this cost can be reduced to $O(\sqrt{n})$ via appropriate bucketing, essentially splitting the added cost to $O(\sqrt{n})$ for both source and server. The alternative scheme would include the following modifications:

With respect to suffixes, a single accumulator is produced containing all the pairs (index, character). Namely, a relation $R_{text}$ is defined that contains tuples of the form (index, character) for the whole text and consequently a single accumulator $acc_{text}$ over all tuples of $R_{text}$. Observe now that in order to prove a match, the proof simply consists of $\pi=\{i,W\}$ where i is the index where the match occurs and W is the witness of the elements $\{(1, p_1) \ldots , (m, p_m)\}$ with respect to $\alpha_{text}$ where p is the queried pattern and m the pattern length. More specifically, W is a witness covering all (index, character) pairs not in the pattern, i.e. the complement of p with respect to text T. All the client needs to do is verify that $W^{\{(i,p_1) \times \ldots \times (m,p_m)\}} = a_{text}$. There are two significant benefits from the above:

With respect to nodes of the suffix tree, a similar approach can be adopted. Assume that all mismatches happen at the middle of a node and not at the end so children nodes and their first characters are not an issue. Then, the only important information that is associated with each node is range and depth. The relation $R_{nodes}$ is formed that contains tuples of the form {depth,range}. Then the proof of a mismatch is $\pi := \{range, depth, i, mismatch\_length, following\_char, W_n, W_t\}$ where range and depth are the values of the node where the mismatch occurred, i is the mismatch index, where mismatch_length is the length of the maximum pattern prefix with occurrence in the text, and finally where following_char is the character right after the mismatch. The witness $W_n$ is the witness of the node with respect to $acc_{nodes}$ and $W_t$ is the witness of $\{(1,p_1), \ldots , (m',p_m), (following\_char, p_m+1)\}$.

The verification procedure can be easily inferred from the above analysis.

To accommodate cases where a mismatch can happen at the end of an edge there are various techniques that can be deployed:

The simplest way is to encode the first character of each child node in the node. Thus, the relation $R_{nodes}$ would contain tuples of the form $\{range, depth, c_1, \ldots , c_k\}$ where k can be up to $|\Sigma|$ which is the alphabet size. Now to prove a mismatch, the server returns exactly the same as above plus all the $c_i$. Proof size is same as above yielding proofs of size $O(|\Sigma|)$.

Alternatively, one can also create a Merkle tree over each node's children's sequel pairs. Then, the tuples of $R_{nodes}$ will be {range,depth,digest}. The proof will contain the sequel pair that invalidates the pattern and a corresponding proof of membership with respect to to the Merkle tree digest. The additional overhead is of order log $|\Sigma|$ (due to the additional hash values).

A third approach is to follow the above method but to use accumulators instead of Merkle trees (which is exactly what we have been doing so far) in which case the proof overhead is constant.

The last two alternatives, while providing an asymptotically better result, have the additional overhead of computing one Merkle tree or one accumulator per node. Rather, assign each node a unique id and make tuples of $R_{nodes}$ of the form {id,range,depth}. Then, a third relation $R_{sequels}$ can be formed which contains tuples of the form {node_id,child_num,char} where all the sequel characters of a node are ordered alphabetically and numbered. Then, the server 120 can return two consecutive characters with their corresponding child_numns and the corresponding witness $W_s$ with respect to $acc_{sequels}$ and the client 130 can verify that no characters lies alphabetically between them under node with node_id since they have consecutive child numbers. The gain here is that only one single accumulator is computed.

The gain from such alternative schemes can be summarized to the following two points. Reduced setup time since there is only one level of accumulation (with appropriate implementation at the source there are only two or three modular exponentiations). Moreover (and perhaps more importantly) the proof sizes are extremely small (less than 1 Kb for reasonable security levels) thus yielding especially bandwidth-sensitive schemes.

Using Alternative Accumulator Schemes

The security, efficiency and parallelism of the exemplary constructions do not explicitly rely on the use of the RSA accumulator primitive. More specifically, one could substitute the RSA accumulator with the bilinear map accumulator (the only known alternative accumulator construction available so far) and these properties would still hold. The bilinear map accumulator is based on different cryptographic assumptions stated over groups of elliptic curves and bilinear pairings defined over them. The major gain from such a transition would be the gain in bandwidth as, using elliptic curve cryptography, one can achieve the same level of security as with RSA, using much smaller groups. Namely, an RSA group defined by a 1024-bit modulo offers the same level of security as an elliptic curve group having size of 160 bits. On a high level, this would reduce the size of all group elements included in our proofs by almost a factor of seven, yielding much shorter proofs and consequently a scheme that would be much more attractive for real-world implementations. One downside related with such an alternative approach would be a slightly increased overhead for verification time due to the bilinear pairing operations involved but, given the group sizes mentioned, this should be inconsequential for most applications.

CONCLUSION

As previously indicated, the above-described embodiments of the invention are presented by way of illustrative example only. Numerous variations and other alternative embodiments may be used, as noted above. Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed by a source of data for outsourcing processing of a pattern matching query on said data to a server, said method comprising:
    precomputing, for said data, by at least one processing device of said source prior to said server receiving said pattern matching query, a suffix tree that to organizes patterns in said data, node accumulation values encoding structural information in said suffix tree, and suffix accumulation values encoding suffixes in said data;
    providing, by said at least one processing device of said source, said data, said precomputed suffix accumulation values, said precomputed node accumulation values and said precomputed suffix tree to said server, wherein said server processes the suffix tree to generate (i) an answer specifying whether for a given pattern in the pattern matching query there is a pattern match or a pattern mismatch based on one or more of predefined matching criteria and predefined mismatching criteria, and (ii) a proof that depends on the pattern matching query, the answer, and one or more of the precomputed suffix accumulation values and the precomputed node accumulation values, wherein said proof comprises a verification of said answer, and
    publishing public information by said at least one processing device of said source.

2. The method of claim 1, wherein said suffix accumulation values comprise, for each Suffix $S_i$ in said data indexed by position i in said data, defining sets:

$X_1 = \{\text{"firstchar"}, T[i] \text{ of a rooted tree } T\};$ $X_2 = \{\text{"index"}, i\};$ $X_3 = \{\text{for } j=i, \ldots n: \text{"poschar"}, T[j], j\};$ and computing said suffix accumulation values $\text{acc}(S_i)$ as an accumulation $\text{acc}(X_1 \cup X_2 \cup X_3)$ of a union of sets X1, $X_2$ and $X_3$ using a cryptographic accumulator.

3. The method of claim 2, wherein said suffix accumulation values further comprise, for each Suffix $S_i$ in said data, structure accumulators $t_i$ as the accumulation $\text{acc}(X_1)$ of said set $X_1$ using said cryptographic accumulator.

4. The method of claim 3, wherein said cryptographic accumulator comprises one or more of an RSA accumulator and a bilinear map accumulator.

5. The method of claim 1, wherein said node accumulation values comprise, for each Node v in said suffix tree, defining sets:

$Y_1 = \{\text{"range"}, s_v, e_v\};$ $Y_2 = \{\text{"depth"}, d_v\};$ where $C_v = v_1, \ldots, v_1$ the children nodes of v, and $c_1, \ldots, c_1$ their first characters ordered alphabetically, $s_v$ corresponds to a start position of a string stored in node v, $e_v$ corresponds to an end position of the string stored in node v and $d_v$ corresponds to a depth of node v, $Y_3 = \{\text{for } j=1, \ldots, |C_v|-1: \text{"sequel"}, c_j, c_{j+1}\};$ and computing said node accumulation values $\text{acc}(v)$ as an accumulation $\text{acc}(v) = \text{acc}(Y_1 \cup Y_2 \cup Y_3)$ of the union of sets $Y_1$, $Y_2$ and $Y_3$ using a cryptographic accumulator.

6. The method of claim 1, wherein the predefined matching criteria determine whether said suffix tree comprises a first suffix and a second suffix such that the first suffix comprises a concatenation of the given pattern with the second suffix.

7. The method of claim 1, wherein the predefined mismatching criteria determine whether said suffix tree comprises a node that is based on a partial match of said given pattern in said data and a suffix indexed based on a first mismatching character following said partial match such that a suffix indexed by a difference between a start position and a depth of said node comprises a concatenation of said partial match with said suffix; and at least one failing condition based on said first mismatching character.

8. The method of claim 1, wherein said public information comprises a public key and one or more verification digests and wherein the method further comprises the step of precomputing verification information used to verify an authenticity of said node accumulation values and said suffix accumulation values with respect to said one or more verification digests.

9. The method of claim 8, wherein said verification information comprises one or more of an accumulation tree, a digital signature, a Merkle Tree, and a publication of said accumulation values.

10. The method of claim 8, wherein said source computes one or more of said suffix tree, said node accumulation values, said suffix accumulation values, said verification information and said public information in parallel.

11. The method of claim 1, wherein said suffix tree comprises a plurality of nodes and wherein each node in the suffix tree has a range indicating a start and end position of a pattern associated with the node, a depth indicating a position of the node in the suffix tree and a sequel indicating an initial set of characters of children of the node, and wherein each leaf node in said suffix tree corresponds to a suffix in said data.

12. A non-transitory machine-readable recordable storage medium for outsourcing processing of a pattern matching query on data to a server, wherein one or more software programs when executed by one or more processing devices implement the following steps:

precomputing, for said data, by at least one processing device of said source prior to said server receiving said pattern matching query, a suffix tree that organizes patterns in said data, node accumulation values encoding structural information in said suffix tree, and suffix accumulation values encoding suffixes in said data;

providing, by said at least one processing device of said source, said data, said precomputed suffix accumulation values, said precomputed node accumulation values and said precomputed suffix tree to said server, wherein said server processes the suffix tree to generate (i) an answer specifying whether for a given pattern in the pattern matching query there is a pattern match or a pattern mismatch based on one or more of predefined matching criteria and predefined mismatching criteria, and (ii) a proof that depends on the pattern matching query, the answer, and one or more of the precomputed suffix accumulation values and the precomputed node accumulation values, wherein said proof comprises a verification of said answer, and publishing public information by said at least one processing device of said source.

13. An apparatus operated by a source of data for outsourcing processing of a pattern matching query on said data to a server, the apparatus comprising:

a memory; and at least one processing device, coupled to the memory, operative to implement the following steps:

precompute, for said data, by said at least one processing device of said source prior to said server receiving said pattern matching query, a suffix tree that organizes patterns in said data, node accumulation values encoding structural information in said suffix tree, and suffix accumulation values encoding suffixes in said data;

provide, by said at least one processing device of said source, said data, said precomputed suffix accumulation values, said precomputed node accumulation values and said precomputed suffix tree to said server, wherein said server processes the suffix tree to generate (i) an answer specifying whether for a given pattern in the pattern matching query there is a pattern match or a pattern mismatch based on one or more of predefined matching criteria and predefined mismatching criteria, and (ii) a proof that depends on the pattern matching query, the answer, and one or more of the precomputed suffix accumulation values and the precomputed node accumulation values, wherein said proof comprises a verification of said answer, and publish public information by said at least one processing device of said source.

14. The apparatus of claim 13, wherein the predefined matching criteria determine whether said suffix tree comprises a first suffix and a second suffix such that the first suffix comprises a concatenation of the given pattern with the second suffix.

15. The apparatus of claim 13, wherein the predefined mismatching criteria determine whether said suffix tree comprises a node that is based on a partial match of said given pattern in said data and a suffix indexed based on a first mismatching character following said partial match such that a suffix indexed by a difference between a start position and a depth of said node comprises a concatenation of said partial match with said suffix; and at least one failing condition based on said first mismatching character.

16. A method performed by a server that performs a pattern matching query on data on behalf of a source of said data, said method comprising:
    obtaining, by at least one processing device of said server, prior to said server receiving said pattern matching query, from said source: said data, a precomputed suffix tree that organizes patterns in said data, precomputed node accumulation values encoding structural information in said suffix tree, and precomputed suffix accumulation values encoding suffixes in said data, wherein said source precomputes said precomputed suffix tree, said precomputed node accumulation values and said precomputed suffix accumulation values prior to said server receiving said pattern matching query;
    receiving, by said at least one processing device of said server, said pattern matching query from a client, wherein said client is a distinct entity relative to said source of said data;
    generating, by said at least one processing device of said server, an answer to said pattern matching query using said suffix tree, wherein said answer specifies whether for a given pattern in the pattern matching query there is a pattern match or a pattern mismatch based on one or more of predefined matching criteria and predefined mismatching criteria;
    computing, by said at least one processing device of said server, a proof that depends on the pattern matching query, the answer, the precomputed suffix accumulation values, and the precomputed node accumulation values, wherein said proof comprises a verification of said answer, and
    providing said proof and said answer to said client.

17. The method of claim 16, wherein the predefined matching criteria determine whether said suffix tree comprises a first suffix and a second suffix such that the first suffix comprises a concatenation of the given pattern with the second suffix.

18. The method of claim 17, wherein said answer comprises a match and wherein said proof comprises one or more of (i) Indices i and j into a data element, and corresponding characters T[i] and T[j]; (ii) Structure accumulators $t_i$ and $t_j$; and (iii) Suffix accumulation values $acc_i$ and $acc_j$ along with verification proofs $\Pi_i$ and $\Pi_j$ verifying an authenticity of said suffix accumulation values $acc_i$ and $acc_j$.

19. The method of claim 18, wherein said one or more of said server computes and said source precomputes said structure accumulators.

20. The method of claim 16, wherein the predefined mismatching criteria determine whether said suffix tree comprises a node that is based on a partial match of said given pattern in said data and a suffix indexed based on a first mismatching character following said partial match such that a suffix indexed by a difference between a start position and a depth of said node comprises a concatenation of said partial match with said suffix; and at least one failing condition based on said first mismatching character.

21. The method of claim 20, wherein said answer comprises a mismatch and wherein said proof comprises one or more of (i) a matching index k and prefix size t; (ii) a node accumulation value $acc_v$ and a verification proof $\Pi_v$ for verifying an authenticity of said node accumulation value; (iii) a subset witness $W_{B,A}$, where B={(range,$s_v$,$e_v$),(depth,$d_v$)} and A=B∪{(sequel,$c_i$,$c_{i+1}$):i=1,K,$\lambda$−1}; (iv) a range ($s_v$,$e_v$) and depth $d_v$; (v) indices i and j into a data element and corresponding characters T[i] and T[j]; (vi) structure accumulators $t_i$ and $t_j$; (vii) suffix accumulation values $acc_i$ and $acc_j$ along with verification proofs $\Pi_i$ and $\Pi_j$ verifying an authenticity of said suffix accumulation values $acc_i$ and $acc_j$; and (viii) when k=$e_v$, the proof also contains a subset witness $W_{P,C}$, where P={(sequel,$c_j$,$c_{j+1}$)} such that $c_j$<$p_{t+1}$<$c_{j+1}$ and C={(sequel,$c_i$,$c_{i+1}$):i=1,$\lambda$−1}.

22. The method of claim 16, wherein said source publishes public information comprising a public key and one or more verification digests and wherein the source precomputes verification information used to verify an authenticity of said node accumulation values and said suffix accumulation values with respect to said one or more verification digests.

23. The method of claim 22, wherein said verification comprises one or more of an accumulation tree (AT), a digital signature, a Merkle Tree, and a publication of said accumulation values.

24. The method of claim 16, wherein said suffix tree comprises a plurality of nodes and wherein each node in the suffix tree has a range indicating a start and end position of a pattern associated with the node, a depth indicating a position of the node in the suffix tree and a sequel indicating an initial set of characters of children of the node and wherein each leaf node in said suffix tree corresponds to a suffix in said data.

25. A non-transitory machine-readable recordable storage medium of a server for performing a pattern matching query on data on behalf of a source of said data, wherein one or more software programs when executed by one or more processing devices implement the following steps:
    obtaining, by at least one processing device of said server, prior to said server receiving said pattern matching query, from said source: said data, a precomputed suffix tree that organizes patterns in said data, precomputed node accumulation values encoding structural information in said suffix tree, and precomputed suffix accumulation values encoding suffixes in said data, wherein said source precomputes said precomputed suffix tree, said precomputed node accumulation values and said precomputed suffix accumulation values prior to said server receiving said pattern matching query;
    receiving, by said at least one processing device of said server, said pattern matching query from a client, wherein said client is a distinct entity relative to said source of said data;
    generating, by said at least one processing device of said server, an answer to said pattern matching query using said suffix tree, wherein said answer specifies whether for a given pattern in the pattern matching query there is a pattern match or a pattern mismatch based on one or more of predefined matching criteria and predefined mismatching criteria;
    computing, by said at least one processing device of said server, a proof that depends on the pattern matching query, the answer, the precomputed suffix accumulation values, and the precomputed node accumulation values, wherein said proof comprises a verification of said answer; and
    providing said proof and said answer to said client.

26. A server apparatus for performing a pattern matching query on data on behalf of a source of said data, the apparatus comprising:

a memory, and
at least one processing device, coupled to the memory, operative to implement the following steps:
obtain, by said at least one processing device of said server, prior, to said server receiving said pattern matching query, from said source: said data, a precomputed suffix tree that organizes patterns in said data, precomputed node accumulation values encoding structural information in said suffix tree, and precomputed suffix accumulation values encoding suffixes in said data, wherein said source precomputes said precomputed suffix tree, said precomputed node accumulation values and said precomputed suffix accumulation values prior to said server receiving said pattern matching query;
receive, by said at least one processing device of said server, said pattern matching query from a client, wherein said client is a distinct entity relative to said source of said data;
generate, by said at least one processing device of said server, an answer to said pattern matching query using said suffix tree, wherein said answer specifies whether for a given pattern in the pattern matching query there is a pattern match or a pattern mismatch based on one or more of predefined matching criteria and predefined mismatching criteria;
compute, by said at least one processing device of said server, a proof that depends on the pattern matching query, the answer, the precomputed suffix accumulation values, and the precomputed node accumulation values, wherein said proof comprises a verification of said answer, and
provide said proof and said answer to said client.

27. The server apparatus of claim 26, wherein the predefined matching criteria determine whether said suffix tree comprises a first suffix and a second suffix such that the first suffix comprises a concatenation of the given pattern with the second suffix.

28. The server apparatus of claim 26, wherein the predefined mismatching criteria determine whether said suffix tree comprises a node that is based on a partial match of said given pattern in said data and a suffix indexed based on a first mismatching character following said partial match such that a suffix indexed by a difference between a start position and a depth of said node comprises a concatenation of said partial match with said suffix; and at least one failing condition based on said first mismatching character.

29. A non-transitory machine-readable recordable storage medium of a client for processing an answer to a pattern matching query performed by a server on data, wherein one or more software programs when executed by one or more processing devices implement the following steps:
providing said pattern matching query to said server, and
receiving, using at least one processing device of said client, from said server an answer to said pattern matching query and a proof, wherein at least one processing device of said server generates said answer to said pattern matching query using a suffix tree precomputed by a source of said data, wherein said suffix tree organizes patterns in said data and wherein said answer specifies for a given pattern in said pattern matching query whether there is a pattern match or a pattern mismatch based on one or more of a predefined matching criteria and a predefined mismatching criteria, and wherein said proof depends on the pattern matching query, the answer, suffix accumulation values encoding suffixes in said data precomputed by said source and node accumulation values encoding structural information in said suffix tree precomputed by said source, wherein said source precomputes said suffix tree, said suffix accumulation values and said node accumulation values prior to said server receiving said pattern matching query, wherein said client is a distinct entity relative to said source of said data and wherein said proof comprises a verification of said answer.

30. A method performed by a client for processing an answer to a pattern matching query performed by a server on data, said method comprising:
providing said pattern matching query to said server, and
receiving, using at least one processing device of said client, from said server an answer to said pattern matching query and a proof, wherein at least one processing device of said server generates said answer to said pattern matching query using a suffix tree precomputed by a source of said data, wherein said suffix tree organizes patterns in said data and wherein said answer specifies for a given pattern in said pattern matching query whether there is a pattern match or a pattern mismatch based on one or more of a predefined matching criteria and a predefined mismatching criteria, and wherein said proof depends on the pattern matching query, the answer, suffix accumulation values encoding suffixes in said data precomputed by said source and node accumulation values encoding structural information in said suffix tree precomputed by said source, wherein said source precomputes said suffix tree, said suffix accumulation values and said node accumulation values prior to said server receiving said pattern matching query, wherein said client is a distinct entity relative to said source of said data and wherein said proof comprises a verification of said answer.

31. The method of claim 30, wherein the predefined matching criteria determine whether said suffix tree comprises a first suffix and a second suffix such that the first suffix comprises a concatenation of the given pattern with the to second suffix.

32. The method of claim 31, wherein said answer comprises a match and wherein said proof comprises one or more of (i) Indices i and j into a data element, and corresponding characters T[i] and T[i]; (ii) Structure accumulators $t_i$ and $t_j$; and (iii) Suffix accumulation values $acc_i$ and $acc_j$ along with verification proofs $\Pi_i$ and $\Pi_j$ verifying an authenticity of said suffix accumulation values $acc_i$ and $acc_j$.

33. The method of claim 32, wherein said proof is processed to verify that said answer is a match if the following are true:
the suffix accumulation values $acc_i$ and $acc_j$ are proved to be authentic using said verification proofs;

$t_l^x = acc_l$, where $x = r(\text{first}, T[l]) r(\text{index}, l)$ for both $l = i, j$; and $t_1 = t_j^x$, where $x = \Pi_{l=1}^m r(\text{pos}, i+l-1, p_l)$.

34. The method of claim 30, wherein the predefined mismatching criteria determine whether said suffix tree comprises a node that is based on a partial match of said given pattern in said data and a suffix indexed based on a first mismatching character following said partial match such that a suffix indexed by a difference between a start position and a depth of said node comprises a concatenation of said partial match with said suffix; and at least one failing condition based on said first mismatching character.

35. The method of claim 34, wherein said answer comprises a mismatch and wherein said proof comprises one or more of (i) a matching index k and prefix size i; (ii) a node accumulation value $acc_v$ and a verification proof $\Pi_v$ for verifying an authenticity of said node accumulation value; (iii) a subset witness $W_{B,A}$, where B={(range,$s_v$,$e_v$),(depth,$d_v$)} and A=B∪{(sequel,$c_1$,$c_{i+1}$):i=1,λ−1}; (iv) a range ($s_v$, $e_v$) and depth $d_v$; (v) indices i and j into a data element and corresponding characters T[i] and T[j]; (vi) structure accumulators $t_i$ and $t_j$; (vii) suffix accumulation values $acc_i$ and $acc_j$ along with verification proofs $\Pi_i$ and $\Pi_j$ verifying an authenticity of said suffix accumulation values $acc_i$ and $acc_j$; and (viii) when k=$e_v$, the proof also contains a subset witness $W_{P,C}$ such that $W_{P,C}{}^x = acc_v$ where P={(sequel,$c_j$,$c_{j+1}$)} such that $c_j < p_{t+1} < c_{j+1}$ and C={(sequel,$c_i$,$c_{i+1}$):i=1,K,λ−1}.

36. The method of claim 35, wherein said answer comprises a mismatch and wherein said method further comprises the step of verifying said answer if the following are true:
 1. the node accumulation values $acc_v$ are proved to be authentic using said corresponding verification proofs;
 2. $W_{B,A}{}^x = acc_v$, where x=r(range,$s_v$,$e_v$)r(depth,$d_v$);
 3. i=$s_v$−$d_v$ and $s_v \le k \le e_v$ and j=k+1 and t<m;
 4. the suffix accumulation values $acc_i$ and $acc_j$ are proved to be authentic using said corresponding verification proofs;
 5. $t_l{}^x = acc_l$, where x=r(first, T[l])r(index,l) for both l=i,j;
 6. $t_i = t_j{}^x$, where $x=\Pi_{l=1}{}^t r(pos,i+l-1,p_l)$; and
 7. If k<$e_v$, then the check that should hold true is $p_{t+1} \ne T[j]$. Else, if k=$e_v$, the check that should hold true is $c_j < p_{t+1} < c_{j+1}$ and $W_{P,C}{}^x = acc_v$, where x=r(sequel,$c_j$,$c_{j+1}$), which checks the condition $p_{t+1} \notin c_v$.

37. The method of claim 30, wherein said source publishes public information comprising a public key and one or more verification digests and wherein the method further comprises the step of receiving precomputed verification information used to verify an authenticity of said node accumulation values and said suffix accumulation values with respect to said one or more verification digests.

38. The method of claim 37, wherein said verification comprises one or more of an accumulation tree (AT), a digital signature, a Merkle Tree, and a publication of said accumulation values.

39. The method of claim 30, wherein said suffix tree comprises a plurality of nodes and wherein each node in the suffix tree has a range indicating a start and end position of a pattern associated with the node, a depth indicating a position of the node in the suffix tree and a sequel indicating an initial set of characters of children of the node and wherein each leaf node in said suffix tree corresponds to a distinct suffix in said data.

40. A client apparatus for processing an answer to a pattern matching query performed by a server on data, the apparatus comprising:
 a memory, and
 at least one processing device, coupled to the memory, operative to implement the following steps:
 provide said pattern matching query to said server, and
 receive, using said at least one processing device of said client apparatus, from said server an answer to said pattern matching query and a proof, wherein at least one processing device of said server generates said answer to said pattern matching query using a suffix tree precomputed by a source of said data, wherein said suffix tree organizes patterns in said data and wherein said answer specifies for a given pattern in said pattern matching query whether there is a pattern match or a pattern mismatch based on one or more of a predefined matching criteria and a predefined mismatching criteria, and wherein said proof depends on the pattern matching query, the answer, suffix accumulation values encoding suffixes in said data precomputed by said source and node accumulation values encoding structural information in said suffix tree precomputed by said source, wherein said source precomputes said suffix tree, said suffix accumulation values and said node accumulation values prior to said server receiving said pattern matching query, wherein said client is a distinct entity relative to said source of said data and wherein said proof comprises a verification of said answer.

41. The client apparatus of claim 40, wherein the predefined matching criteria determine whether said suffix tree comprises a first suffix and a second suffix such that the first suffix comprises a concatenation of the given pattern with the second suffix.

42. The client apparatus of claim 40, wherein the predefined mismatching criteria determine whether said suffix tree comprises a node that is based on a partial match of said given pattern in said data and a suffix indexed based on a first mismatching character following said partial match such that a suffix indexed by a difference between a start position and a depth of said node comprises a concatenation of said partial match with said suffix; and at least one failing condition based on said first mismatching character.

* * * * *

UNITED STATES PATENT AND TRADEMARK OFFICE
CERTIFICATE OF CORRECTION

PATENT NO.        : 10,409,845 B1
APPLICATION NO.   : 13/838793
DATED             : September 10, 2019
INVENTOR(S)       : Charalampos Papamanthou et al.

Page 1 of 1

It is certified that error appears in the above-identified patent and that said Letters Patent is hereby corrected as shown below:

In the Claims

Column 25, Line 57, Claim 9 replace "The method of claim 8, wherein said verification information comprises one or more of an accumulation tree, a digital signature, a Merkle Tree, and a publication of said accumulation values" with --The method of claim 8, wherein said verification comprises one or more of an accumulation tree (AT), a digital signature, a Merkle Tree, and a publication of said accumulation values--.

Column 28, Line 10, within Claim 21 replace "$W_{P,C}$, where $P = \{(sequel, c_j, c_{j+1})\}$ such that $c_j < p_{t+1} < c_{j+1}$ and $C = \{(sequel, c_i, c_{i+1}): i = 1, \lambda - 1$" with --$W_{P,C}$, where $P = \{(sequel, c_j, c_{j+1})\}$ such that $c_j < p_{t+1} < c_{j+1}$ and $C = \{(sequel, c_i, c_{i+1}): i = 1, K, \lambda - 1$--.

Signed and Sealed this
Twenty-first Day of July, 2020

Andrei Iancu
*Director of the United States Patent and Trademark Office*